Oct. 14, 1969  J. W. BRODERICK ET AL  3,472,376
ELECTRICAL COMPONENT TESTER WITH PREFERENTIAL SORTING
Filed June 29, 1965  24 Sheets-Sheet 22
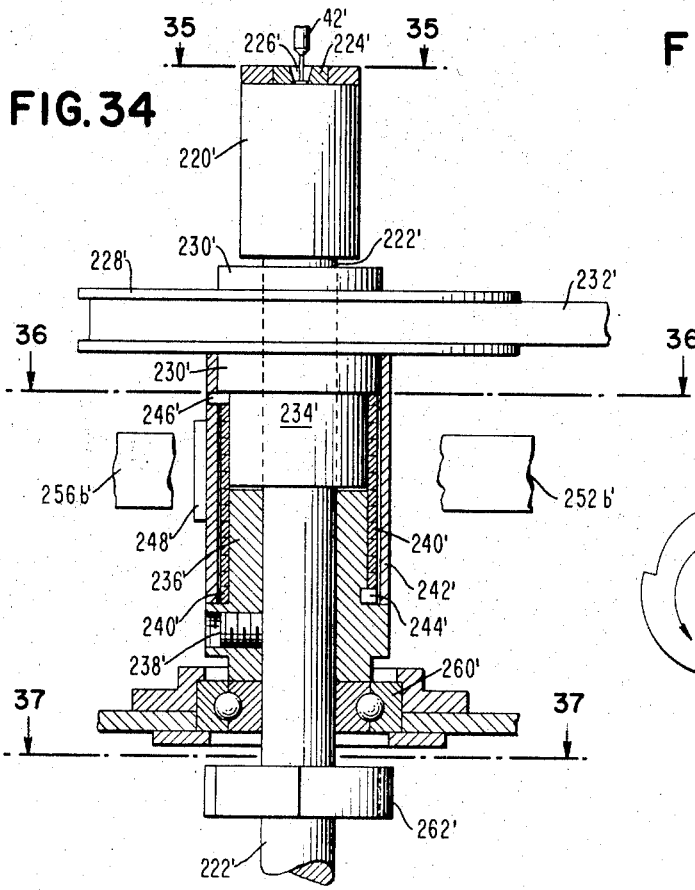
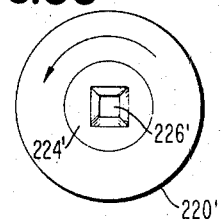
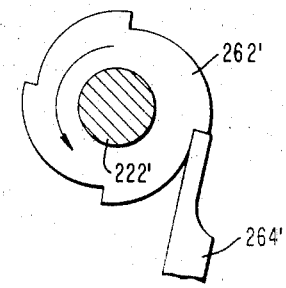
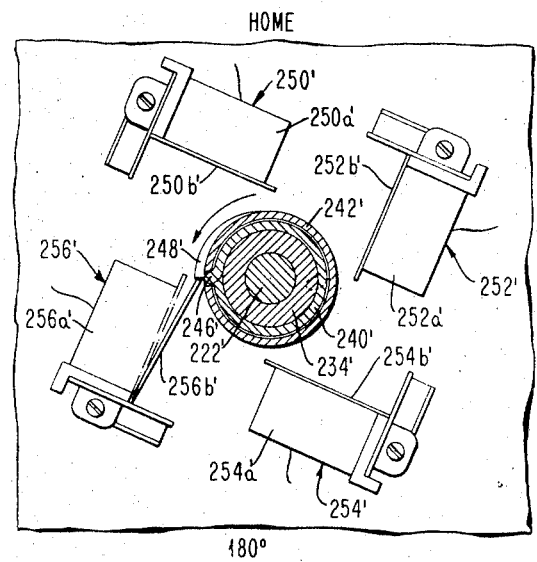

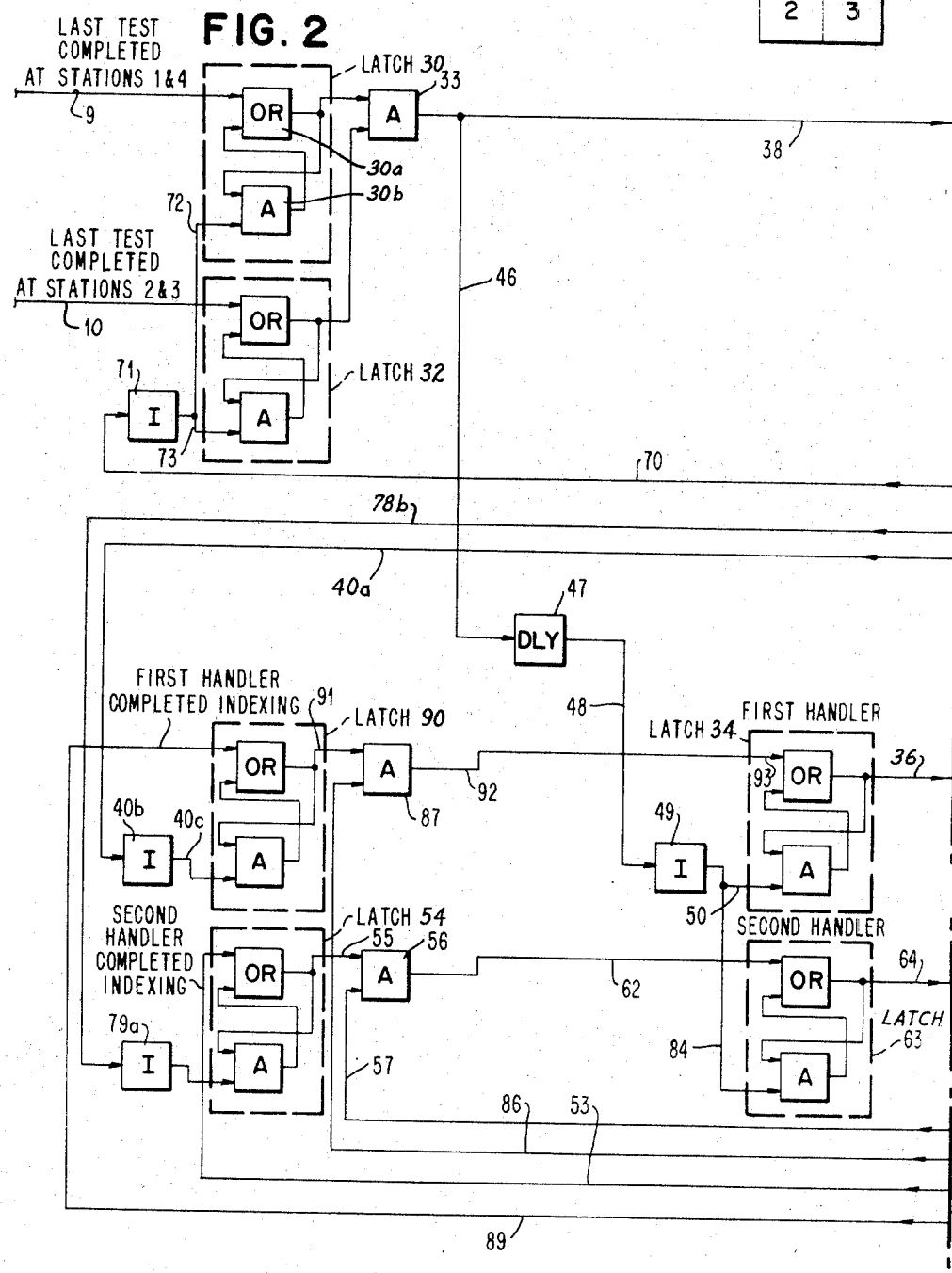

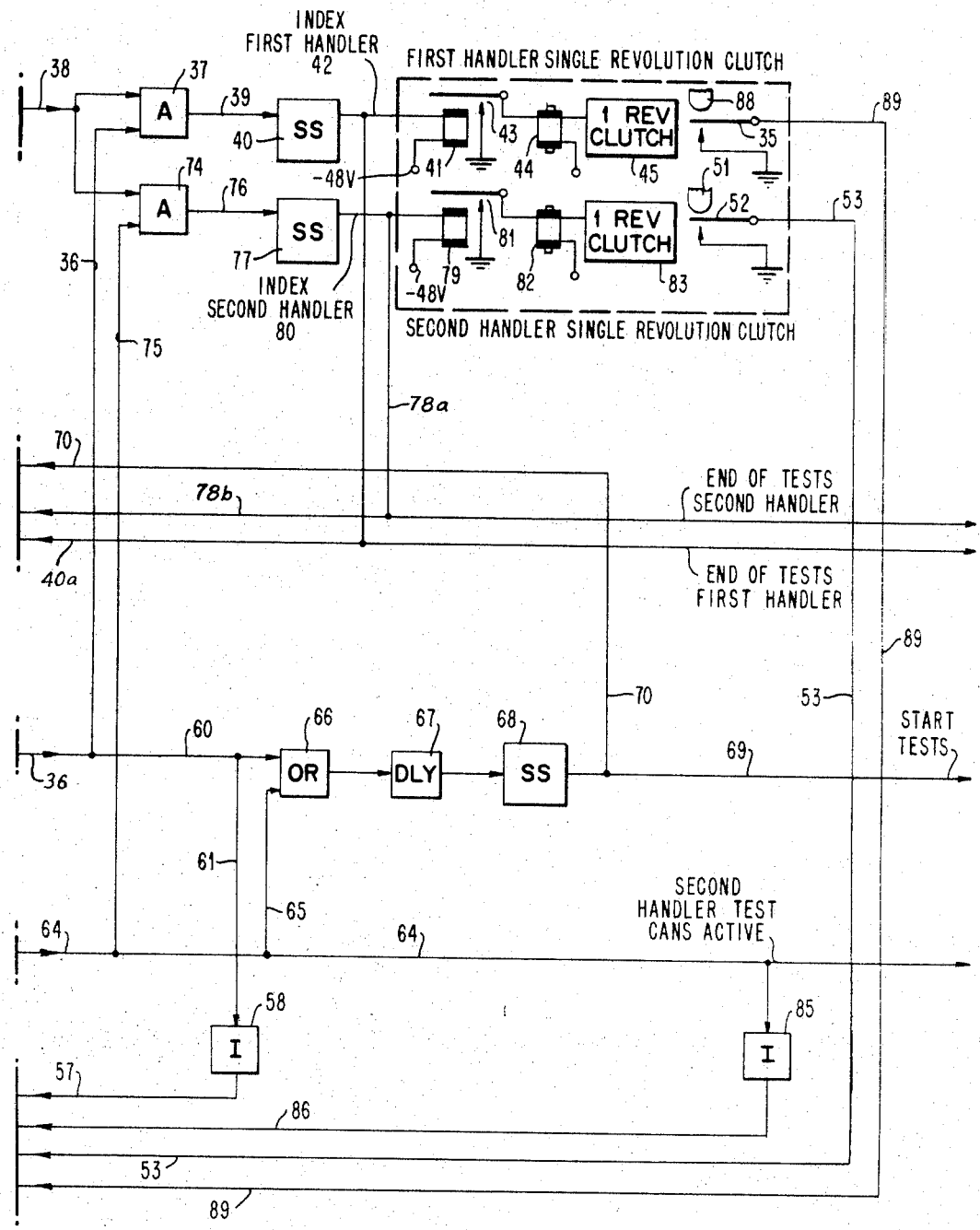

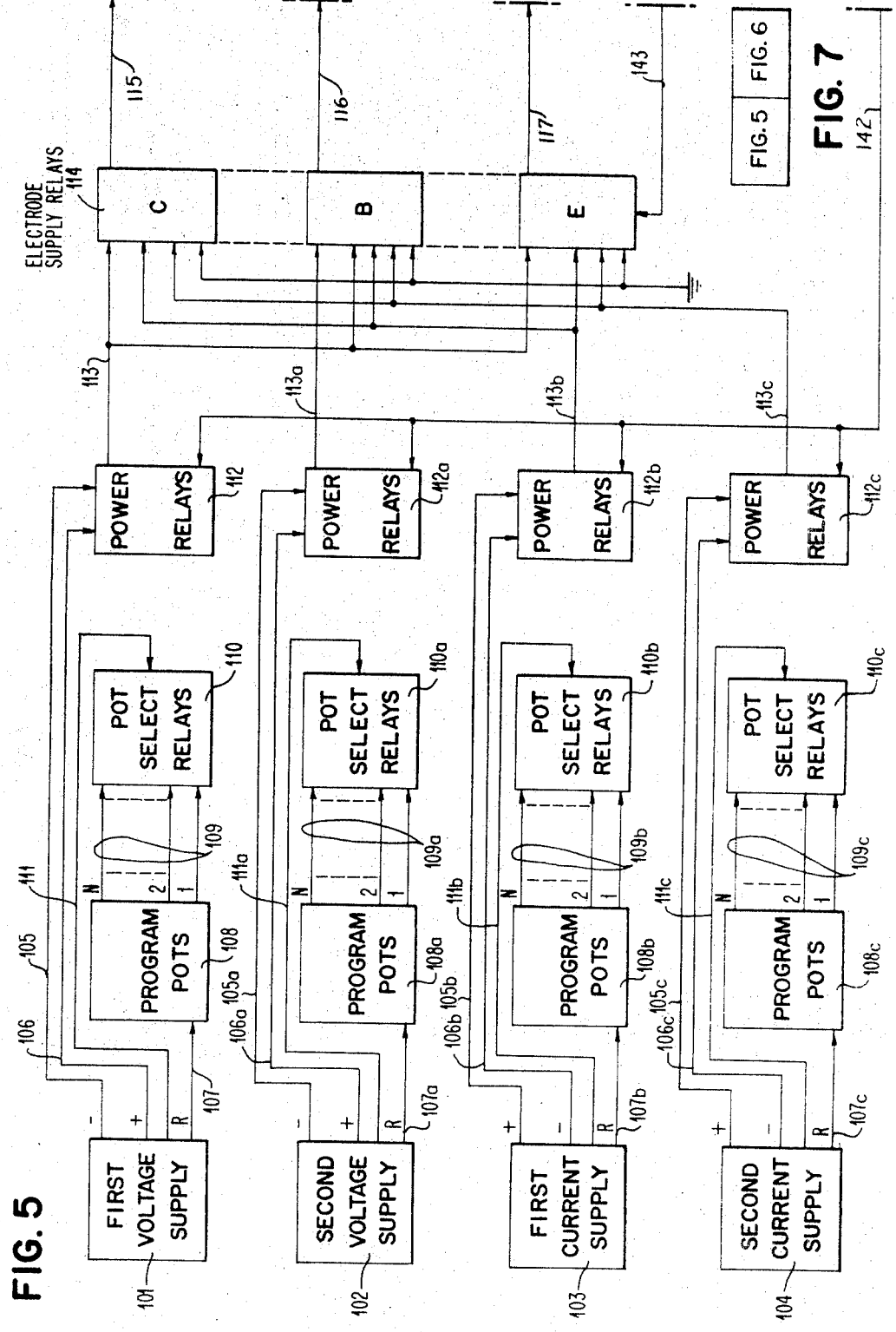

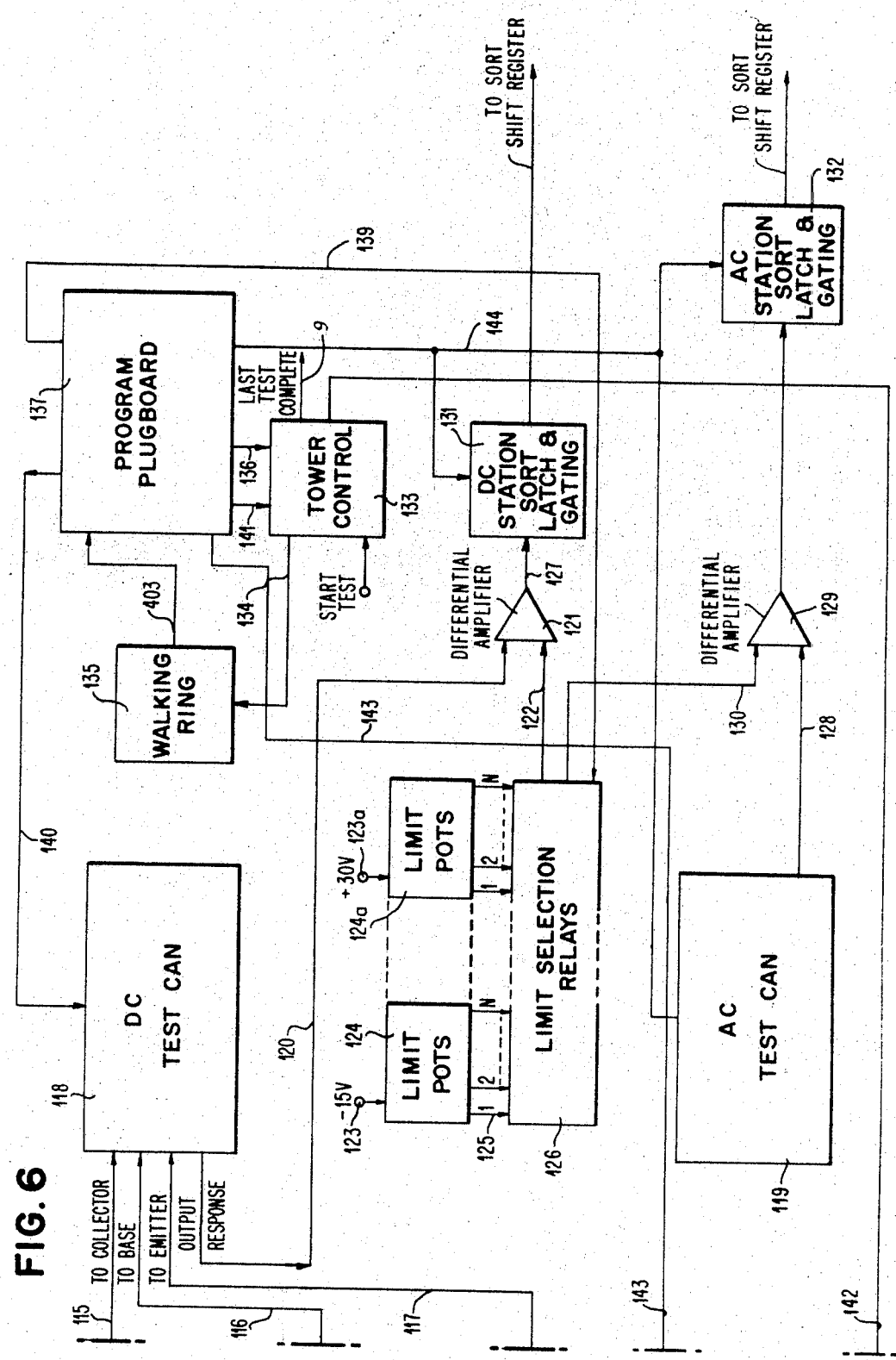

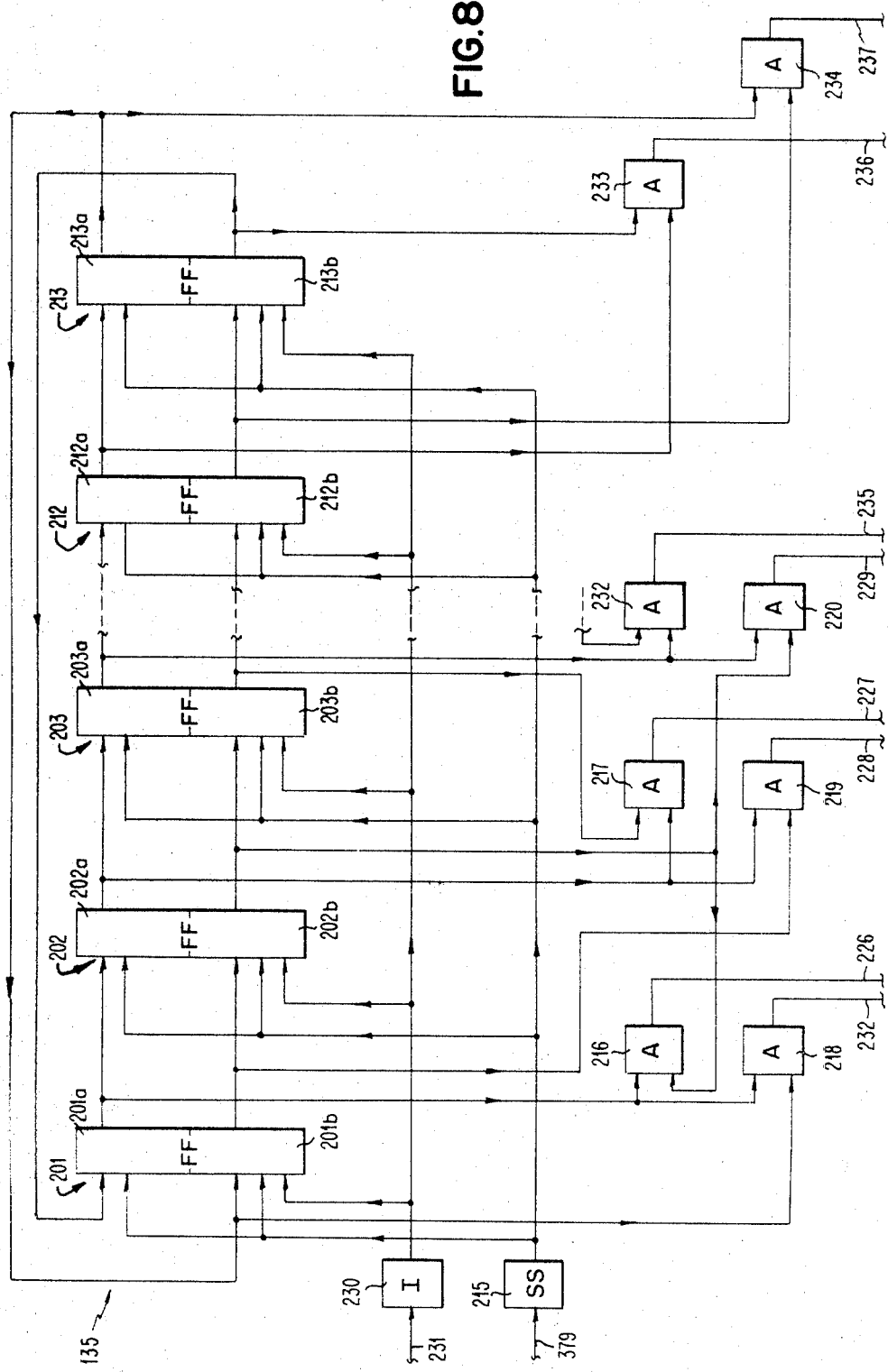

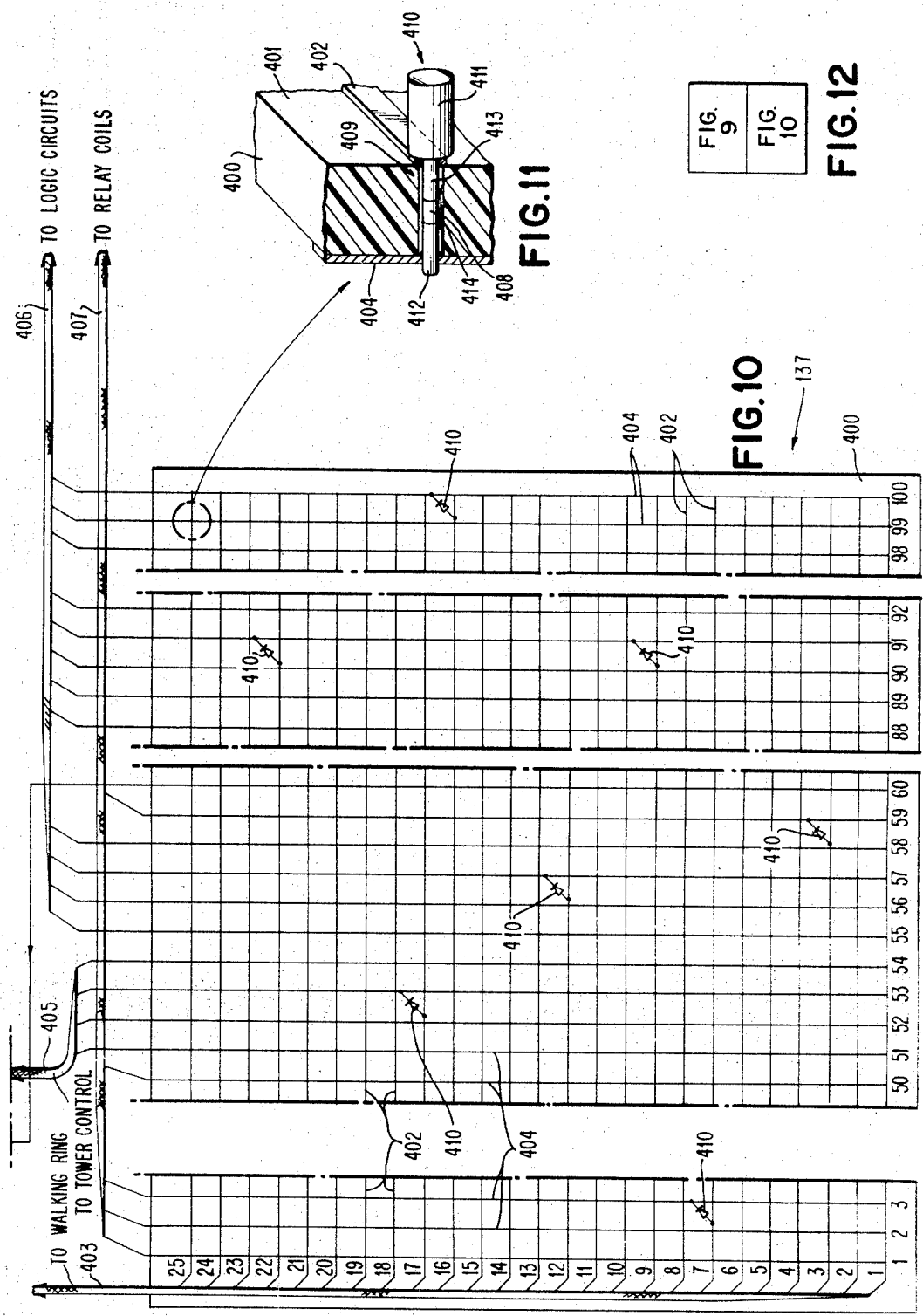

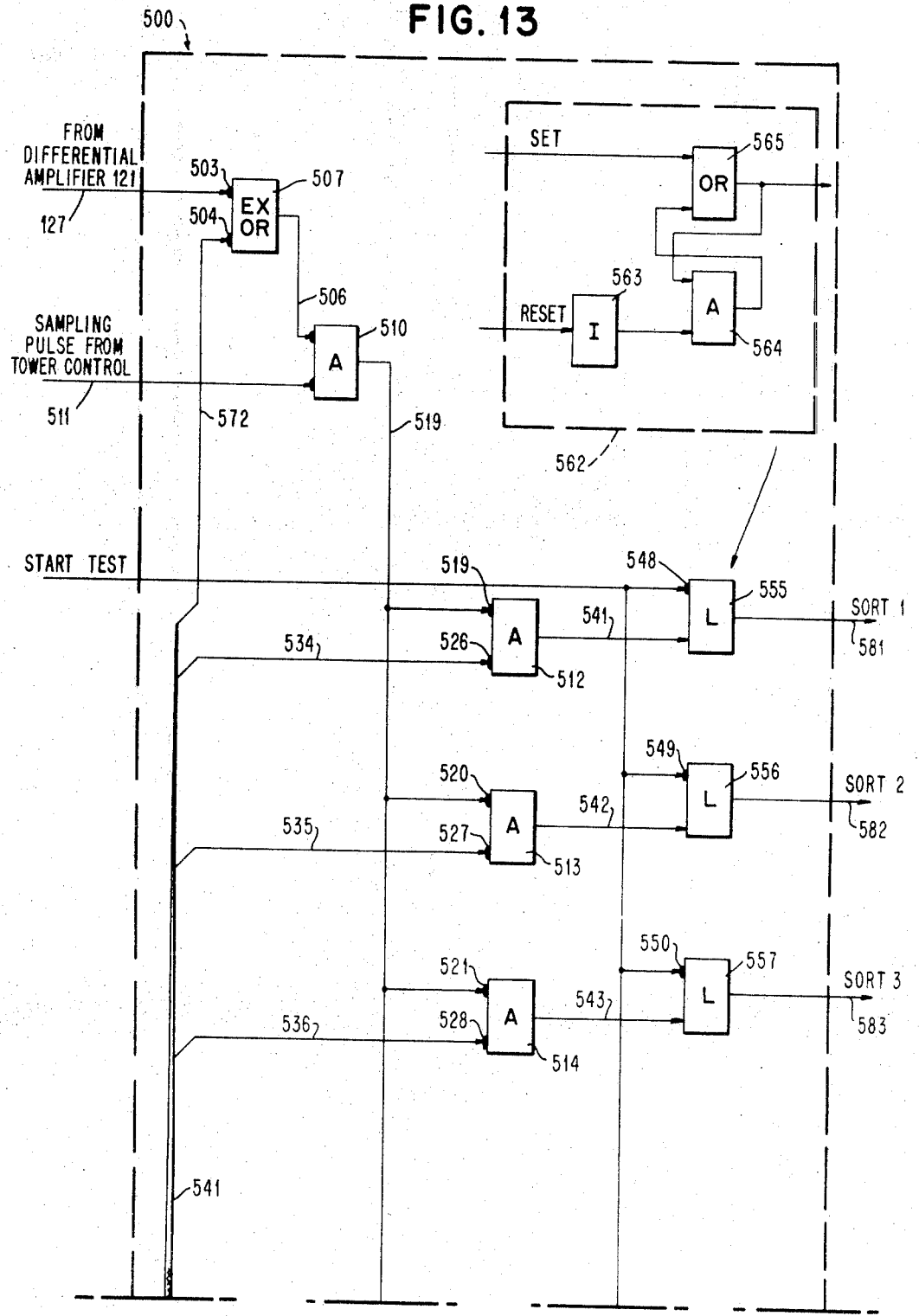

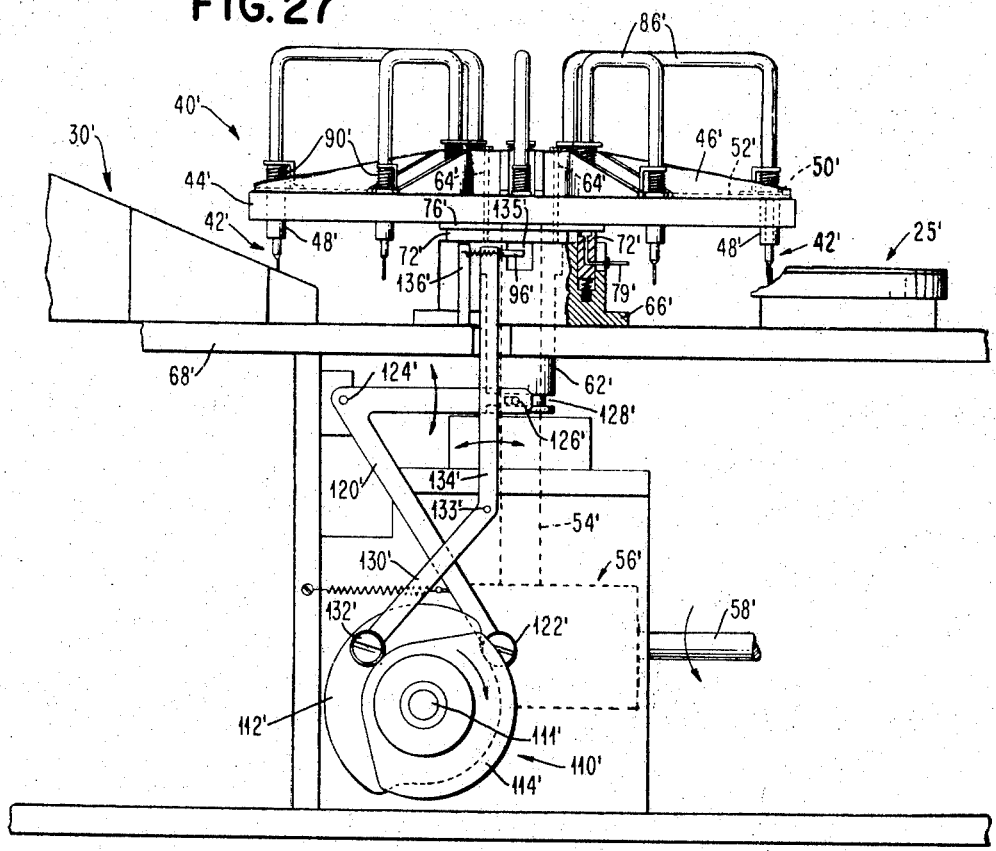
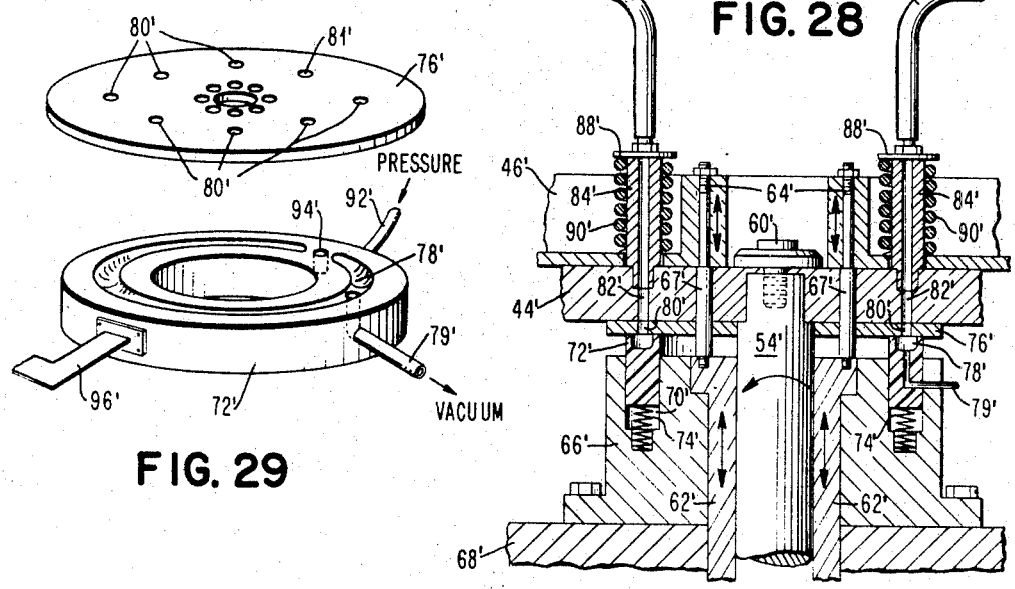

Oct. 14, 1969  J. W. BRODERICK ET AL  3,472,376
ELECTRICAL COMPONENT TESTER WITH PREFERENTIAL SORTING
Filed June 29, 1965  24 Sheets-Sheet 24

United States Patent Office 3,472,376
Patented Oct. 14, 1969

3,472,376
ELECTRICAL COMPONENT TESTER WITH PREFERENTIAL SORTING
John W. Broderick, Rte. 9G, Hyde Park, N.Y. 12538; Robert M. Fiorenza, 5 Wilbur Blvd. 12603, and Michael Kozar, 34 Monroe Drive 12601, both of Poughkeepsie, N.Y.; and Harry L. Lineman, 20 Donny Drive, Wappingers Falls, N.Y. 12590
Filed June 29, 1965, Ser. No. 468,420
Int. Cl. B07c 5/344
U.S. Cl. 209—75     4 Claims

ABSTRACT OF THE DISCLOSURE

The apparatus automatically tests and sorts electrical components such as semiconductor chips. A preferential sorting arrangement is provided whereby each chip is dispensed into a container corresponding to the highest priority sort for which it has qualified as a result of the tests. The preferential sorting arrangement operates in a combinatorial mode in that the apparatus determines simultaneously for all of the sorts which is the highest priority sort for which the chip has qualified as a result of the entire series of tests. A plurality of logic gates are each associated with a respective one of the sorts and each logic gate is provided with an activating input and an inhibiting input so as to be activated in response to the presence of an activating signal simultaneous with the absence of an inhibiting signal. A first circuit arrangement transmits an activating signal to the activating inputs of those logic gates corresponding to sorts for which the chip has qualified, and another circuit arrangement transmits an inhibiting signal to the inhibiting inputs of those gates corresponding to all sorts of priority lower than each of the sorts for which the chip has qualified. A sorting mechanism then dispenses the chip into that sort corresponding to the single gate which will then be activated in response to the two circuit arrangements.

---

This invention relates generally to apparatus for automatically testing and sorting electrical components such as semiconductor chips, and more particularly to a novel preferential sorting arrangement whereby each chip is dispensed into a container corresponding to the highest priority sort for which it has qualified as a result of the tests.

In the prior art of automatic electrical component testing apparatus, preferential sorting has usually been accomplished by a sequential mode of operation. That is, the test results of the component under test are compared with the qualifying requirements for each of the sorts or categories in sequence. The logic circuitry of the apparatus then selects the highest priority sort of all those for which the component has qualified and the component is then dispensed into a container corresponding to that sort. This sequentially operating apparatus of the prior art is inherently complex, expensive and difficult to set up and to maintain.

It is therefore a primary object of the present invention to provide a novel apparatus for automatically sorting and testing electrical components wherein the preferential sorting means operates in a combinatorial mode. That is, the apparatus determines simultaneously for all of the sorts which is the highest priority sort for which the component has qualified as a result of the entire series of tests. Because of this combinatorial mode of operation, the subject apparatus is simpler, more economical and more reliable in operation than the sequential type of preferential sorting apparatus of the prior art.

The subject invention further provides a novel structure for realizing this combinatorial mode of operation.

More specifically, the apparatus comprises a plurality of gates or similar circuits each associated with a respective one of the sorts and each having an activating input and an inhibiting input so as to be activated in response to the presence of an activating signal simultaneous with the absence of an inhibiting signal, a circuit arrangement to transmit an activating signal to the activating inputs of those gates corresponding to sorts for which the chip has qualified, another circuit arrangement to transmit an inhibting signal to the inhibiting inputs of those gates corresponding to all sorts of priority lower than each of the sorts for which the chip has qualified, and a sorting means to dispense the chip into that sort corresponding to the single gate which will then be activated as a result of said two circuit arrangements.

The foregoing and other objects, features and advantages of the invention will be apparaent from the following more particular description of preferred embodiments of the invention, as illustrated in the accompanying drawings, wherein:

FIGS. 2 and 3 show the circuitry of the system control;

FIG. 4 is a composite view showing the relationship of FIGS. 2 and 3;

FIGS. 5 and 6 show schematically the circuitry within each of the towers;

FIG. 7 is a composite view showing the relationship of FIGS. 5 and 6;

FIG. 8 shows the circuitry of the walking ring generator;

FIG. 10 is a schematic front elevational view of the program plugboard;

FIG. 11 is an enlarged cross-sectional perspective view of a portion of the plugboard shown in FIG. 10;

FIG. 12 is a composite view showing the relationship of FIGS. 9 and 10;

FIGS. 13 and 14 show the circuitry of one of the eight identical station sorting latches;

FIG. 15 is a composite view showing the relationship of FIGS. 13 and 14;

FIG. 19 shows the base and collector voltage waveforms for a transition measurement during turn-on;

FIG. 22A shows the means for subtracting the successive voltage to obtain a transition time measurement;

FIG. 27 is a front partial section view of the semiconductor device handler and tester.

FIG. 28 is an enlarged sectional view of a portion of the apparatus of FIG. 27.

FIG. 29 is an isometric view of a vacuum valve which is incorporated into the apparatus.

FIG. 34 is a partial section view of the semiconductor device orientor station.

FIG. 35 is a view along line 35—35 of the topmost portion of the semiconductor device orientor.

FIG. 36 is a view taken along line 36—36 of the orientor of FIG. 34.

FIG. 37 is a view taken along line 37—37 of the orientor of FIG. 34.

OVERALL SYSTEM

Figure 1:
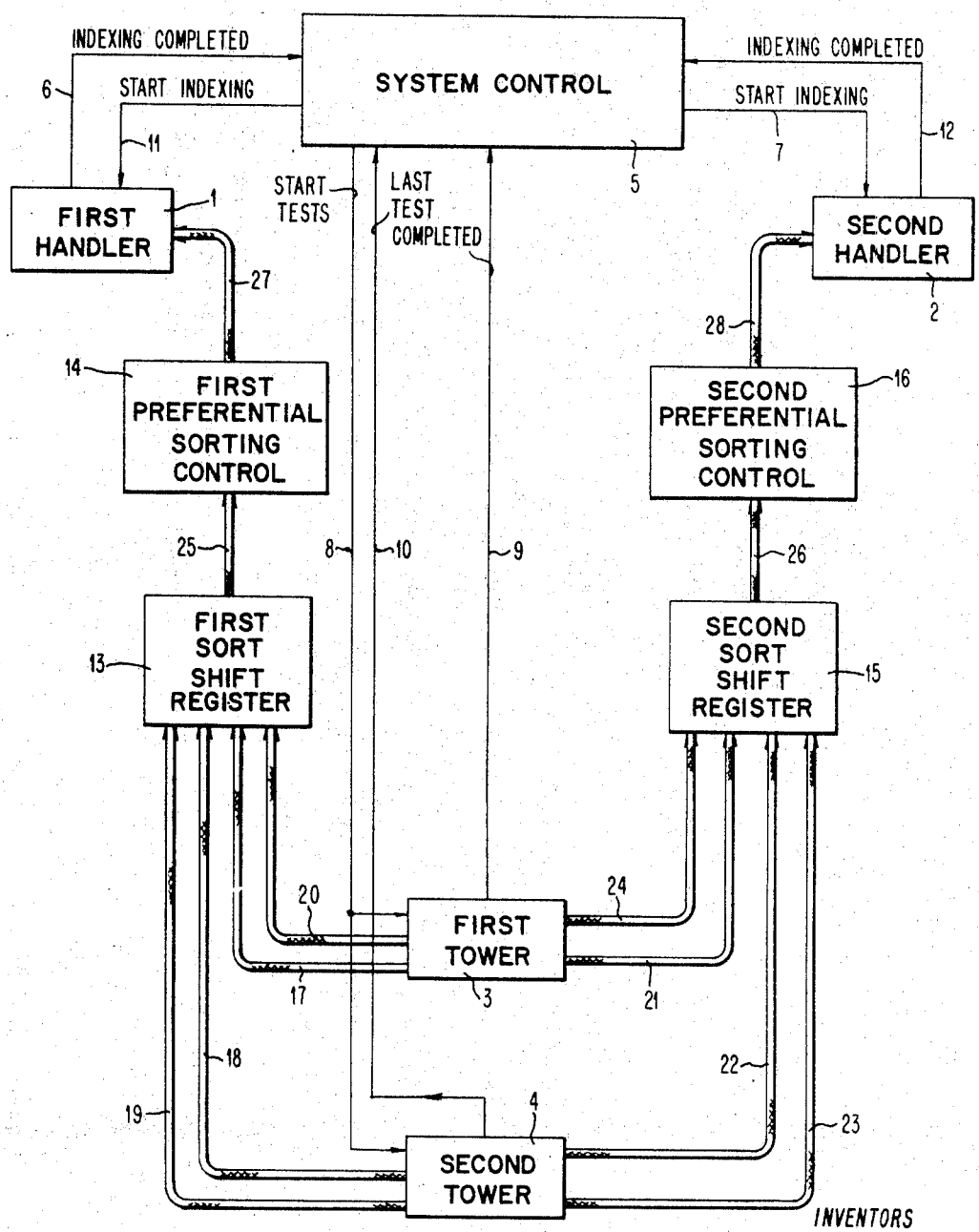
FIG. 1 is a schematic view of the overall system arrangement of the subject invention.

Referring first to FIG. 1, the overall system arrangement of the subject apparatus will first be generally described in functional terms, after which the structure and mode of operation of each component will be described in detail. The specific embodiment of the invention disclosed for illustrative purposes comprises a pair of chip handlers designated in FIG. 1 as "First Handler" 1 and "Second Handler" 2. Each of these handlers functions to orient the chips and to feed each chip in sequence to a series of four test stations and then finally to a sort station where the chip is dispensed into one of eight compartments depending upon the results of the electrical tests performed at the four stations.

The pair of handlers 1, 2 operate in what may be termed a "duplex" manner. That is, while tests are being performed at the four chips located at the four respective test stations of one handler, the other handler is being indexed to convey each chip to the next successive station. After the tests are completed at the one handler, it is then indexed while the other handler remains stationary so that its chips may be subjected to the testing operations.

The circuitry controlling the electrical tests is contained within two cabinets designated respectively in FIG. 1 as "First Tower" 3 and "Second Tower" 4. Although these towers 3, 4 may be structurally identical to each other, they are preferably programmed to perform different sets of tests. The tower circuitry is duplicated and divided into the two separate towers 3, 4 merely for convenience in mechanical packaging, and if desired the entire circuitry of both towers may be combined in a single cabinet.

Each of towers 3, 4 controls the tests at two of the stations of both chip handlers 1, 2. More specifically, first tower 3 controls the so-called "AC" or transient response tests at Station No. 1 of first handler 1 and also the same tests at Station No. 1 of second handler 2. First tower 3 also controls the DC tests at Station No. 4 of first handler 1 and also at the same station of second handler 2. Similarly, second tower 4 controls at AC tests at each Station No. 2 of both first handler 1 and second handler 2 as well as a set of DC tests at each Station No. 3 of both handlers 1, 2.

Indicated generally by the reference numeral 5 is a system control which initiates the indexing operations of chip handlers 1 and 2, receives signals from the latter to the effect that the indexing is completed, signals towers 3, 4 to start their test operations, and receives signals from towers 3, 4 when the tests are completed. System control 5 times the operations of handlers 1, 2 to provide the so-called "duplex" operation noted above.

More specifically, system control 5 receives a signal from first handler 1 on line 6 to the effect that first handler 1 has completed its indexing operation. System control 5 then transmits a signal on line 7 to second handler 2 initiating the indexing operation of the latter if it has finished testing. System control 5 also sends a signal to first tower 3 and second tower 4 on line 8 to initiate the test operations on the four chips located at the respective four stations of first handler 1. The completion of the tests by first tower 3 is communicated to system control 5 on line 9 and the completion of the tests by second tower 4 is communicated to system control 5 on line 10. System control 5 then signals first handler 1 on line 11 to initiate its indexing movement and receives on line 12 a signal from second handler 2 to the effect that its indexing operation is completed. Line 8 is then energized by system control 5 to initiate the testing operations at towers 3, 4 for the four chips located at the respective four locations of handler 2, and the cycle of operation is then continually repeated with each handler alternately indexing its chips while the chips at the other handler are undergoing tests.

Associated with both towers 3, 4 and first handler 1 is a first sort shift register 13 and a first preferential sorting control 14. Similarly associated with both towers 3, 4 and second handler 2 is a second sort shift register 15 and a second preferential sorting control 16. After a chip has been subjected to an entire sequence of AC tests at Station No. 1 of first handler 1, first tower 3 communicates through cable 17 to first sort shift register 13 the information as to which of the seven sorts or categories if any, the chip qualifies as a result of the tests. That is, the apparatus may be programmed so that in order to qualify for any particular one of seven possible "pass" sorts, the chip must pass certain or all of the sequence of tests at Station No. 1. Cable 17 thus comprises seven lines each of which when energized (that is, at a positive DC level) indicates that a chip has passed all of the tests required to qualify for a respective one of the seven possible sort categories. Similarly, cable 18 comprises seven lines for the respective seven sorts for which the chip may qualify after being subjected to the entire sequence of AC tests at Station No. 2 of first handler 1. Cables 19 and 20 each comprise seven lines for the respective sequences of DC tests at Station No. 3 and Station No. 4 of first handler 1. Cables 21 to 24 inclusive provide similar sort signals from towers 3, 4 to the second sort shift register 15 in connection with the AC and DC tests performed at the four stations of the second chip handler 2.

Each of the sort shift registers 13, 15 stores the sort information for each chip as the chip advances from station to station. That is, if a chip is finally to quality for a particular sort category, it must qualify for such at all four stations and will be disqualified for that sort category if it fails any one of the required tests at any one of the four stations. As the chip passes from station to station, its sort characterization is shifted from stage to stage of one of shift registers 13, 15. This shifting operation is initiated by signals on lines 13a, 15a from system control 5 after both towers 3, 4 complete all the tests of each sequence.

The seven sorts or categories are assigned a priority ordering with Sort No. 1 having the highest priority and Sort No. 7 the lowest. If a chip fails to qualify for any of the seven "pass" sorts, it is sorted into an eighth "reject" category. If a chip qualifies for a plurality of sorts, it is assigned to that sort having the highest priority. For example, if a chip were to qualify for Sort Nos. 3, 6 and 8, it would be finally assigned to Sort No. 3. The function of assigning each chip to the highest priority sort for which it qualifies is performed by first preferential sorting control 14 for those chips tested at first handler 1 and by second preferential sorting control 16 for those chips tested at second handler 2. Each of the cables 25, 26 from sort shift registers 13, 15 to the respective preferential sorting controls 14, 16 comprises thirteen signal lines including seven lines to indicate a "pass" for each of the respective seven sorts and 6 lines for the first six sorts to provide "inhibit" signals for deactivating latches corresponding to the lower sorts in a manner to be described below. Cables 27, 28 extending from preferential sorting controls 14, 16 to the respective chip handlers 1, 2 each comprise seven signal lines corresponding respectively to the seven sorts.

SYSTEM CONTROL

The circuitry details of system control 5 are shown in FIGS. 2 and 3 and will now be described. As explained below, each of towers 3, 4 comprises a tower control shown in detail in FIG. 9. In FIG. 2 the input line 9 from this tower control will be energized when the testing operations at Stations Nos. 1 and 4 have been completed. Energizing this input line 9 will set latch 30. Each of the latches referred to hereinafter is conventional and comprises an OR gate as at 30a and an AND gate as at 30b interconnected in the usual manner. The other input line 10 from said tower control will be energized when the testing operations at Stations Nos. 2 and 3 have been completed, thereby setting latch 32. When both latches 30 and 32 have been set, AND gate 33 is activated and its output rises to a positive potential.

Assuming that first handler 1 has just completed its testing operations and is ready to be indexed, whereas second handler 2 has just completed indexing and is ready to start testing, system control 5 will operate as follows. Latch 34 was previously set by the closure of cam-actuating switch contacts 35 (FIG. 3) at the completion of the previous indexing operation of first handler 1 in a manner to be described. Line 36 extending from the output of latch 34 is thus energized to satisfy one of the two inputs to AND gate 37 (FIG. 3) thereby coacting with signal from activated AND gate 33 through line 38 to satisfy the other input to AND gate 37. The activated output of the latter will be transmitted through line 39 to actuate the single-shot multivibrator 40 which generates a 200 millisecond pulse to energize the relay coil 41 through line 42, thereby closing relay contacts 43 to energize solenoid 44 and actuate a single-revolution clutch 45. The latter indexes first handler 1 to cause each chip to be conveyed to the next successive test station. The output of single-shot multivibrator 40 is transmitted through line 40a to inverter 40b (FIG. 2) which provides a negative pulse on line 40c to latch 90 thereby resetting the latter.

The activated output of AND gate 33 is also transmitted through line 46 to a delay network 47. The delay time of the latter is 50 microseconds which is sufficiently long to permit single-shot multivibrator 40 to be triggered and thereby index first handler 1 before latch 34 is reset by the signal transmitted from delay 47 through line 48 and inverter 49 to the reset input 50 of said latch 34.

The indexing movement of a second handler 2 actuates a cam 51 which closes switch contacts 52 at the completion of the handler indexing movement. Closure of switch contacts 52 energizes line 53 thereby setting latch 54 to indicate that second handler 2 has completed its indexing operation. The output 55 of latch 54 consitutes one of the inputs to AND gate 56 having its other input energized by line 57 from inverter 58 (FIG. 3). Activation of AND gate 56 (FIG. 2) energizes line 62 to set latch 63 thereby energizing the output line 64 of the latter to indicate that the test cans of second handler 2 are active.

Line 64 is connected by line 65 (FIG. 3) to OR gate 66 connected in series with a 3 millisecond delay 67 to actuate a single-shot multivibrator 68 providing a 50 microsecond pulse output on line 69 to provide a signal initiating the testing operations of both towers 3 and 4. The output of single-shot multivibrator 68 is transmitted through line 70 to inverter 71 (FIG. 2) and then to the reset inputs 72, 73 of latches 30, 32 respectively to reset the latter.

When the tests at all four stations of second handler 2 have been completed, input lines 9, 10 from the respective tower controls of towers 3, 4 are energized, thereby setting latches 30, 32 to activate AND gate 33 and thereby energize through line 38 one of the two inputs to AND gate 74 (FIG. 3). The other input to the latter is energized by line 75 extending from the output 64 of the set latch 63. The output 76 of AND gate 74 is thereby energized to actuate another single-shot multivibrator 77 having a 200 millisecond pulse and thereby energize relay 79 through line 80. Relay contacts 81 are thereby closed to energize solenoid 82 and actuate the single-revolution clutch 83 to cause second handler 2 to undergo its indexing operation. The output of single-shot multivibrator 77 is transmitted through lines 78a, 78b to inverter 79a (FIG. 2) thereby resetting latch 54.

The activation of AND gate 33 energizes the reset input 84 of latch 63 to reset the latter through line 46, delay 47 and inverter 49 in the manner described above with respect to the resetting of latch 34. Resetting of latch 63 provides a negative-going signal on line 64 which is inverted by inverter 85 (FIG. 3) to provide a positive pulse on line 86 to one of the inputs to AND gate 87 (FIG. 2), the other input 91 of gate 87 being activated by the closing of said switch contacts 35 by cam 88 when first handler 1 completes its indexing operation. The closure of switch contacts 35 (FIG. 3) energizes line 89 to set latch 90 (FIG. 2) having its output energizing said input 91 of AND gate 87. Activation of the latter transmits a pulse through line 92 to the set input 93 of latch 34, thereby setting the latter and initiating the test at first handler 1.

TOWER CIRCUITRY

Referring now to FIGS. 5 and 6, there is shown the circuitry within each of the towers 3, 4. There are provided two regulated variable voltage supplies 101, 102 and two regulated variable current supplies 103, 104. The first voltage supply 101 has a negative output line 105, a positive output line 106 and a pair of remote control lines 107, 111. One of the remote control lines 107 is connected to one end of each of a bank of program potentiometers 108. Each of the latter is provided with a conventional wiper arm (not shown) connected to a respective one of the N lines 109 extending to a bank of potentiometer selection relays 110. The other remote control line 111 also extends to the relay bank 110 so that actuation of the latter will select one of the program potentiometers 108 and place the latter across the lines 107, 111.

By manually adjusting the wiper arms of the respective program potentiometers 108, the magnitude of the resistance extending from one remote control line 107 to the other remote control line 111 may be selectably varied. First voltage supply 101 is constructed in a conventional manner so that the voltage appearing across output lines 105, 106 is varied in accordance with the resistance placed across remote control lines 107, 111. It will thus be seen that each of the program potentiometers of the bank 108 may be adjusted so that when selected by the potentiometer selection relay bank 110 it will provide across output lines 105, 106 a test voltage of the desired magnitude. The polarity of this test voltage may be made either positive or negative by actuation of the bank of power relays 112. Therefore the output line 113 of the latter may have for each test a potential of the desired magnitude and polarity.

Second voltage supply 102 is provided with the same control circuitry discussed above with respect to first voltage supply 101. This circuitry is designated by corresponding reference numerals to which the suffix "a" is appended. The two current supplies 103, 104 are also provided with similar control components designated by corresponding reference numerals having the suffix "b" and "c" appended thereto respectively. Instead of a regulated voltage output lines 105b, 106b of first current supply 103 and output lines 105c, 106c of second current supply 104 provides regulated current which are selectably varied by the adjustment of the particular program potentiometer 108b, 108c placed across the respective remote control lines 107b, 111b and 107c, 111c by the potentiometer selection relay bank 110b and 110c.

The reference numeral 114 indicates generally a bank of electrode supply relays which are programmed during each test to switch a particular one of the supply lines 113, 113a, 113b or 113c to a collector supply line 115, a base supply line 116, and an emitter supply line 117. The lines 115, 116, 117 are connected respectively to the collector, base and emitter of the transistor chip under test through conventional circuitry (not shown) within a DC test can 118 (FIG. 6). The construction of the latter is well-known and will not be described. The so-called AC or transient response tests are performed by a novel AC test can 119 which is provided with its own power supplies, as will be described in detail below. The test cans or testing means 118, 119 are associated with plurality of test stations for performing a sequence of electrical tests on each electrical means fed to each of the test stations. The testing means 118, 119 are operative to provide or generate a plurality of output signal responses, with each output signal response being associated with a particular test.

The responses of the transistor chip being subjected to a sequence of DC tests are transmitted through line 120 to one input of a differential operational amplifier or first means 121. The amplifier 121 is responsive to sequentially receive the plurality of output signal responses from the testing means, such as 118 or 119 so as to produce a pass or fail indication for each of the output signal responses. The other input 122 of the differential amplifier 121 is supplied with a DC reference voltage in the following manner. At 123 there is shown a negative supply of —15 volts connected to a bank of limit potentiometers 124 each having a wiper arm (not shown) connected to a respective one of the N lines 125 any selected one of which may be connected by programmed actuation of the bank of limit selection relays 126 so as to apply an adjustable selected reference voltage to the reference input 122 of differential amplifier 121. Relays 126 will be actuated during each test to select one of potentiometers 124 in accordance with the programming of a plugboard arrangement to be described below. In an identical manner, a positive 30 volt supply 123a is connected to a second set of limit pots 124a and then to the differential amplifier 121 through limit selection relays 126. Differential amplifier 121 is of conventional well-known construction and functions to provide a positive output on line 127 when the output response of the transistor chip under test is of a voltage higher than the reference voltage at the reference input 122.

As explained in more detail below, AC test can 119 conducts a series of tests relating to the transient response characteristics of the transistor under test. There will appear on the output line 128 of AC test can 119 a series of DC signals each representing a respective one of the transient response characteristics of the tested transistor. These DC signals are fed into one input of another differential amplifier 129. Again as in the case of the DC tests, limit selection relays 126 apply a series of reference voltages to the reference input 130 of differential amplifier 129.

Figures 14, 15:
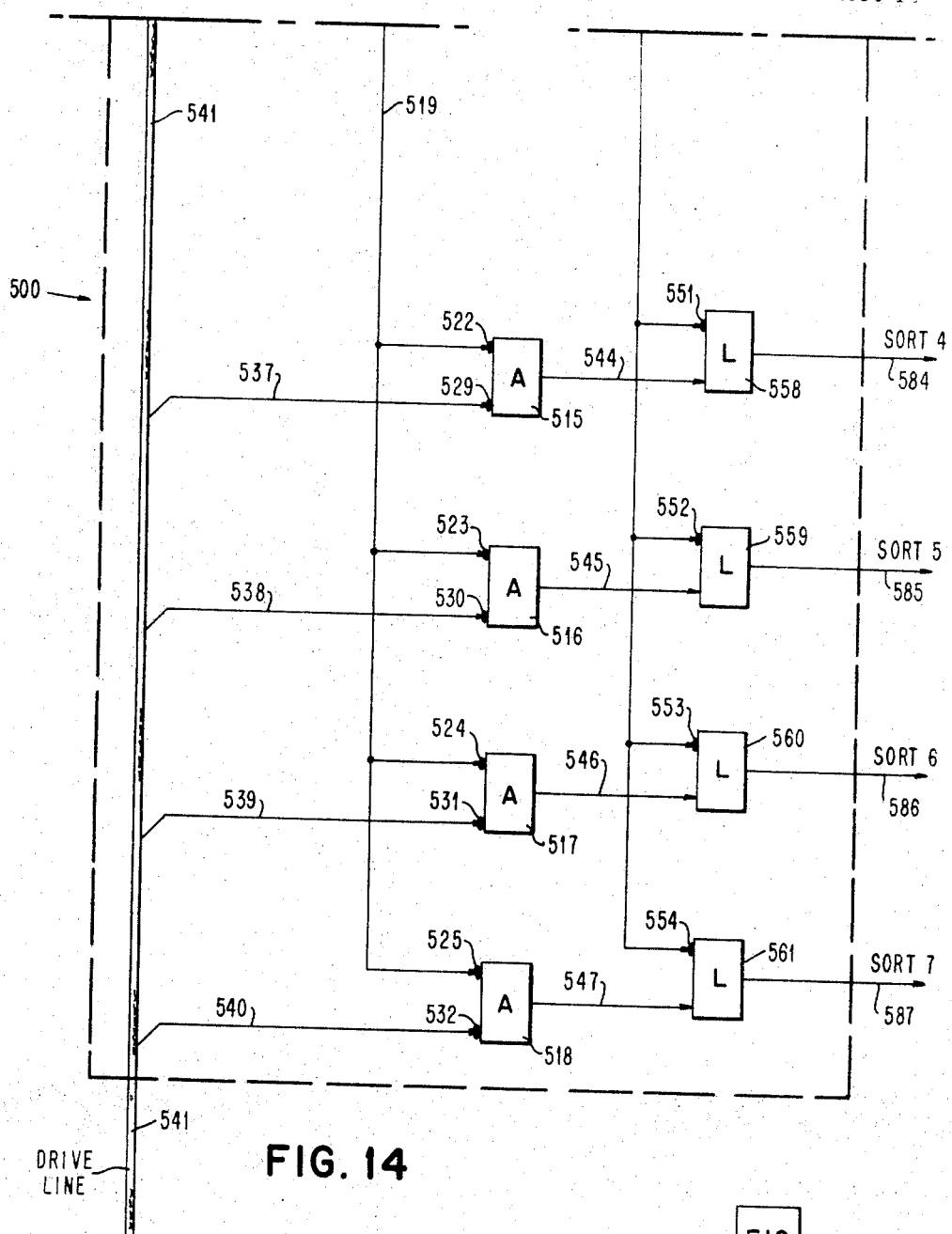

In both the AC and DC systems, differential amplifiers 121, 129 compare the reference signal with the test can output and produce positive or negative voltage which represent the test results of the transistor and which are fed to sort latch and gating circuits 131 and 132 described in detail with respect to FIGS. 13 to 15.

A "start test" signal from system control 5 is fed into tower control 133 which is described in detail in connection with FIG. 9. The function of tower control 133 is to generate a series of clock timing signals through line 134 for controlling a walking ring generator 135. Input 136 extends to tower control 133 from a program plugboard 137 to transmit a signal indicating the start of the last test of a sequence. For example, if only twenty tests are to be conducted, the "last test" drive line will be programmed in program plugboard 137 to actuate tower control 133, when walking ring generator 135 reaches the twentieth step. This "last test" signal cycles the tower control 133 for completion of the last test. When the last test is completed tower control 133 generates a signal to this effect and which is fed on line 9 or 10 to system control 5. When system control 5 receives a "last test complete" signal from both towers 3, 4 it generates an indexing signal to the handler 1 or 2 at which the tests have been completed.

Tower control 133 in conjunction with a timed signal from program plugboards 137 through line 141 controls power relays 112 to 112c (FIG. 5) through line 142. Upon coincidence of the signal from plugboard 137 and tower control 133, power relays 112 to 112c are energized and connect voltage and current supplies, 101, 102, 103, 104 through the electrode supply relays 114 to DC test can 118.

Walking ring 135 will be described in detail below in connection with FIG. 8. Basically, it comprises a series of flip/flops which are sequentially stepped and set by signals from tower control 133. Walking ring generator 135 provides a sequence of 25 positive level pulses which are sequentially fed to program plugboard 137. The function of the latter is to control the timing and operation of each of the switching circuits in each of the control and test systems in a manner to be described. Plugboard 137 connects a "last test" signal through line 136 into tower control 133, controls the limit selection relays 126 through line 139, the AC test can 119 through line 144, the DC test can 118 through line 140, and the electrode supply relays 114 through line 143.

WALKING RING GENERATOR

Referring now to FIG. 8, walking ring generator 135, first referred to in the description of FIG. 6, is shown therein in detail. Circuit 135 generates a series of 25 timing signals to control the sequence of each of the individual tests performed by the subject apparatus. Walking ring circuit 135 comprises 13 flip/flop stages designated 201 to 213 inclusive, and are connected in series. For ease of description, only stages 201, 202, 203, 212 and 213 are shown and described.

The operation of each flip/flop stage is as follows. An individual one of stages 201 to 213 is considered to be in the "on" condition when its upper output terminal is at a positive potential and its lower output terminal is at a negative potential. The condition of an individual flip/flop stage is changed when an appropriate gating signal from the previous flip/flop stage and a step ring signal from the single-shot multivibrator 215 are applied simultaneously. Single-shot 215 is actuated by a signal from the tower control (FIG. 9) after each test is finished. The construction of flip/flop stages 201 to 213 and single-shot 215 are well-known in the art and are therefore not described herein in detail.

Each half of each individual flip-flop stage 201 to 213 is designated with the reference numeral suffix "a" or "b" and is actuated by the corresponding half of the preceding flip/flop stage. For example, the upper half 202a of stage 202 is gated by the upper half 201a of stage 201. Obviously, an exception thereto is stage 201, the upper half 201a of which is actuated by the lower half 213b of stage 213 and the lower half 201b of stage 201 is actuated by the upper half 213a of stage 213.

The initial condition of the walking ring circuit 135 is the "reset" condition wherein all of flip/flops 201 to 213 are in the "off" condition. That is, all of the outputs from the upper "a" halves of flip/flops 201 to 213 are at a negative potential and all of the outputs from the lower "b" halves of flip/flops 201 to 213 are at a positive potential. In this condition, a positive signal is applied to the upper half 201a of flip/flop 201 from the lower half 213b of flip/flop 213 whereas each of the remaining flip/flops 202 to 213 inclusive has a negative potential present on its upper "a" half from the upper "a" half of the respective preceeding flip/flop. Thus, when a step-ring signal from the tower control (FIG. 9) is applied to all of the flip/flops 201 to 213, only stage 201 switches from the "off" condition to the "on" condition.

This switching provides a positive potential to one of the inputs of AND gate 216. The other input of gate 216 is derived from the output of the lower half 202b of flip/flop 202. This input is also at a positive potential since 202 is in an "off" condition. Thus, AND gate 216 is activated and its output rises to a positive potential providing a positive signal on outline line 226, thereby initiating the first test. When flip/flop 201 switches to the "on" condition, it provides a positive potential to the upper half 202a of flip/flop 202.

Thus, when a second step-ring signal from the tower control (FIG. 9) is applied, it will cause flip/flop 202 to switch to the "on" condition. This applies a positive potential to one of the inputs of AND gate 217. The other input of 217 is derived from the lower half 203b of flip/flop 203. This input is at a positive potential since 203 is in its "off" condition. Thus, AND gate 217 is activated and its output rises to a positive potential providing a positive signal on output line 227, thereby initiating the second test.

This process continues until all thirteen stages 201 to 213 of the walking ring generator 135 have been switched to the "on" condition. At this time AND gate 218 is activated and provides a positive signal to output line 232, thereby initiating the thirteenth test. Flip/flop 201 is now in the "on" condition and has a positive potential applied to its lower half 201b from the upper half 213a of flip/flop 213. A step-ring signal from the tower control (FIG. 9) applied at this time will cause flip/flop 201 to switch to the "off" condition. When flip/flop 201 switches to the "off" condition, the output of its lower half 201b becomes positive, applying a positive potential to one input of AND gate 219. The other input gate 219 is derived from the upper half 202a of flip/flop 202. This input is at a positive potential since 202 is in the "on" condition. Thus, AND gate 219 is activated and its output rises to a positive potential providing a positive signal on output line 228 thereby initiating the fourteenth test.

The switching of flip/flop 201 to the "off" condition provides a positive potential to the lower half 202b of flip/flop 202. Thus, the next step-ring signal from the tower control will cause flip/flop 202 to switch to the "off" condition, thereby activating AND gate 220 and providing a signal on output line 229 in the manner previously described. This process continues until all of the flip/flops 201 to 213 have been switched to the "off" condition. AND gates 232, 233 and 234, as well as the other AND gates in sequence which have been omitted in FIG. 8 for clarity in illustration, operate in a similar manner to provide successive test initiating signals on the output lines of which lines 235, 236 and 237 are further examples. Provision is made for resetting walking ring circuit 135 to its initial phase by application of a positive signal from tower control (FIG. 9) to input line 231. This positive signal applied to input 231 switches all thirteen flip/flops 201 to 213 inclusive to an "off" condition by applying thereto a negative "reset" signal from inverter 230.

TOWER CONTROL

Figure 9:
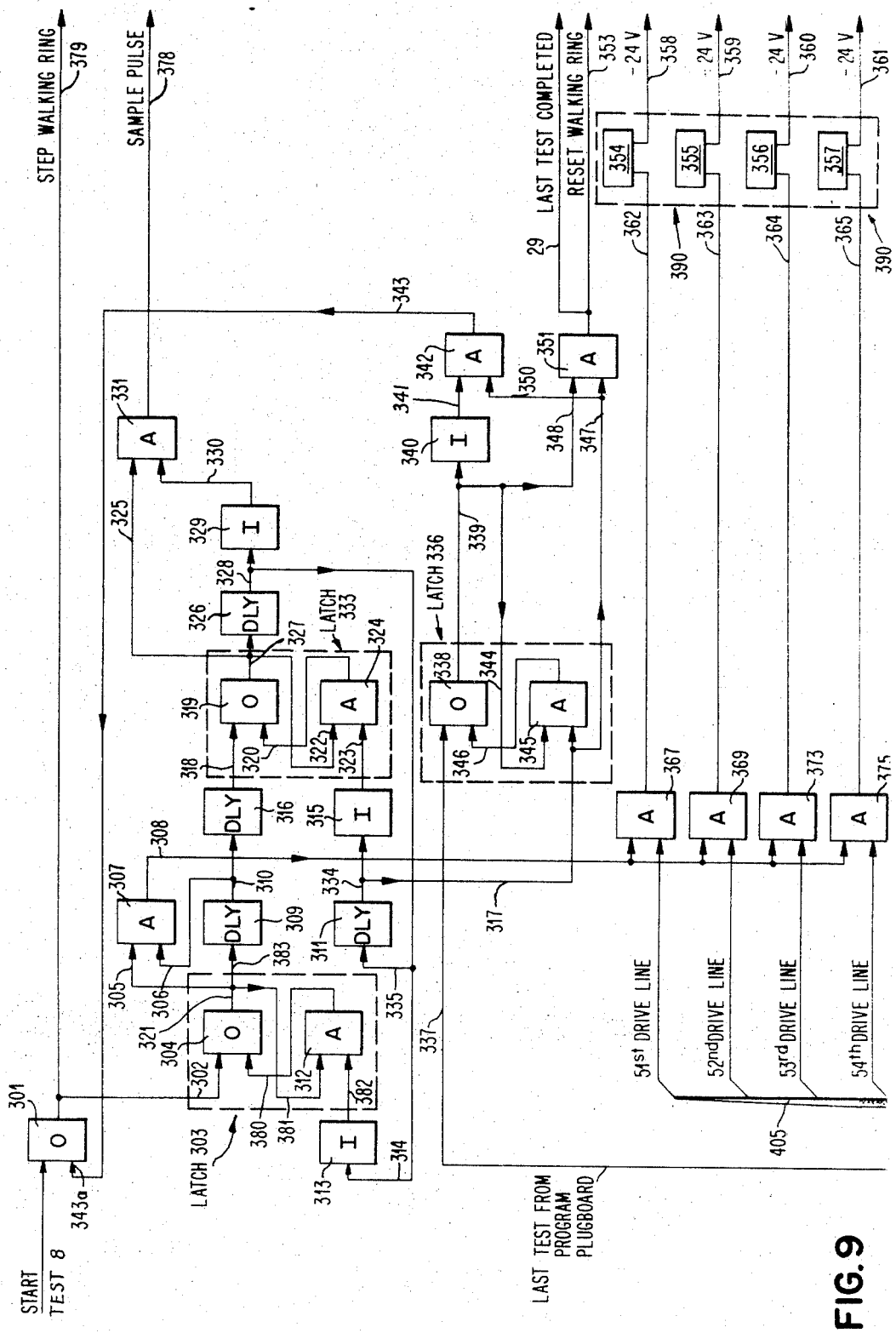
FIG. 9 shows the circuitry for each of the tower controls.

Referring now to FIG. 9, there is illustrated a detailed circuit diagram of each of the two tower controls. A "start test" on input line 8 from the system control is fed into an OR gate 301. Upon receipt of this "start test" signal, OR gate 301 transmits through line 379 a pulse to the single-shot multivibrator 215 of the walking ring generator 135 described above with respect to FIG. 8.

An output line 302 of OR gate 301 is also fed into a latch designated generally at 303. As described hereinafter, receipt of a signal on line 302 sets latch 303. Assume initially that the latch 303 is in a "reset" state in which the potential on input line 302 is negative. The potential on output line 321 is then negative and the potential on line 308 at the output of AND gate 307 is also negative. The potential on line 381 is negative and further assume that the potential on line 382 is positive. AND gate 312 is in the "off" state. OR gate 304 is also in an "off" state.

A positive input signal on line 302 into the set input of latch 303 causes OR gate 304 to be turned "on" so that a positive signal appears on line 381. Since initially AND gate 312 has a positive level on input line 382 thereto, AND gate 312 is turned on, causing a positive signal to be applied through line 380 to the input of OR gate 304. The result is that the latch 303 is now set with a positive signal on terminals 383 and 380. A positive signal remains on these terminals until latch 303 is reset. From the above description it is evident that the receipt of a positive input signal on line 302 will "set" latch 303, causing lines 305 and 383 to become positive.

This output signal on line 305 is applied directly to one input of AND gate 307 and indirectly to the other input of AND gate 307 through a 2 millisecond delay network 309. Thus, after this delay time AND gate 307 is activated and its output 308 rises to a positive potential which exists for 3.5 milliseconds. The output line 308 applies a positive potential to one of the inputs of each of the AND gates 367, 369, 373 and 375. The latter are also gated by the 51st and 54th drive lines described below with respect to FIG. 10 which shows the program plugboard 137. The drive lines direct the command signals which specify which test operation is to be conducted during a test step. The coincidence of positive inputs on both inputs of one of the AND gates 367, 369, 373 and 375 energizes a respective one of the power supply relay coils 354 to 357 inclusive. Energization of the latter in turn activates the associated test circuitry.

For example, if for a particular test the operations controlled by the 51st drive line are programmed on the program plugboard 137, this line will be at ground potential, which is considered a "positive" signal. When AND gate 307 is activated, the coincidence of the positive signals at both inputs of AND gate 367 will cause the latter to be activated, thereby energizing power relay coil 354 through line 362. With relay coil 354 energized, its associated relay contacts will switch during the test.

If, for example, the 52nd drive line has not been programmed into the circuit, an output on line 308 from AND gate 307 will not cause AND gate 369 to be activated. Consequently, relay coil 355 will not be energized and its associated circuitry will not be in operation during this test step.

The output line 383 from latch 303 is also used to set latch 333 after the pulse is delayed by a 2 millisecond delay network 309 and a 3.5 millisecond delay network 316. The signal on line 318 entering latch 333 thus arrives 5.5 milliseconds after the original signal on line 383 leaves latch 303. The positive signal at input 318 sets latch 333, in the same manner as was described above with reference to latch 303, thereby causing the potential on lines 327 and 325 to go positive to the upper or ground level.

The positive signal on line 327 causes a delay network 326 to feed a positive pulse to line 328 about 50 microseconds later. The input line 330 to AND gate 331 is normally positive. When the signal at line 325 and the normally positive signal at line 330 coincide, AND gate 331 is activated, thereby raising the potential on line 378.

The output of delay network 326 is inverted by inverter 329 and causes line 330 to become negative thereby turning off AND gate 331. As a result, the positive signal on line 378 has a pulse duration of 50 microseconds. This pulse is fed to the station sort latches circuits 131, 132 as described below with respect to FIGS. 13 to 15.

The pulse on line 328 from the delay network 326 is also fed through line 314 to inverter 313 where it is inverted and transmitted through line 382 to the "reset" input of latch 303. The signal on line 328 is also fed through line 335 to a 2 millisecond delay network 311. The output of the latter is inverted by inverter 315 and then transmitted to the reset input 323 of latch 333.

Latch 336 is normally in a reset condition, that is, lines 339, 346 and 344 are normally at a negative potential. When a delayed signal on line 317 enters latch 336, latch 336 does not switch because there is no "last test" signal from the program plugboard 137 on line 337. With latch 336 in the "reset" condition, a negative voltage on line 339 is inverted by inverter 340 to a positive signal on line 341. Coincidence of a positive signal on line 341 and a positive signal on line 350 from line 347 causes AND gate 342 to be activated to feed a positive signal on line 343 to OR gate 301 thereby providing a positive output on line 379 to cause the walking ring generator to step to the next phase for the next test.

It should be noted that while latch 336 is in the "reset" condition, a negative signal is present on line 348, thereby inhibiting AND gate 351 from triggering the "last test completed" signal and the "reset walking ring" signal.

On the occurrence of the last test for which program plugboard 137 has been programmed in a cycle, a positive signal is fed via line 337 into latch 336. This positive signal causes latch 336 to switch to produce a positive output signal on line 339, in the manner described above with reference to latch 303. This positive signal on line 339 is inverted by inverter 340 to prevent AND gate 342 from being activated. A negative signal on line 343 is thereby applied to input 343a of OR gate 301 to sequentially step walking ring generator 379. This signal is necessary because the "start test" signal from the system control is only generated for the first test of a sequence.

A positive signal on line 339 is also transmitted through line 348 to activate AND gate 351 and generate a "last test completed" signal on output line 29 and also on line 353 to reset walking ring generator 135.

PROGRAM PLUGBOARD

Referring now to FIGS. 10 and 11, there is shown program plugboard or sort requirement means 137 which provides means to program the subject apparatus for each AC and DC test, that is, the plugboard 137 selectively generates priority sort classification signal information for each test performed. There is one plugboard 137 per tower, as shown in FIG. 6.

Plugboard 137 comprises a rectangular sheet 400 of insulating material and having on its front face 401 thereof a series of twenty-five horizontal conductive copper strips 402 spaced vertically from each other. At the left hand edge of plugboard 137, each of these horizontal strips 402 is designated with a number corresponding to a respective one of the twenty-five tests comprising the maximum number in any particular sequence. The left hand terminals of horizontal strips 402 are connected to leads constituting a cable 403 leading from walking ring generator 135.

The opposite surface of insulating sheet 400 of plugboard 137 is provided thereon with a series of one hundred vertical copper strips 404 spaced horizontally from each other and extending substantially perpendicular to the horizontal copper strips 402. Each of the vertical strips 404 constitutes a drive line for energizing a particular relay coil or logic circuit. Energization of a relay or circuit consists of connecting one terminal thereof to ground and thereby causing current to flow through the relay coil or circuit to the opposite terminal thereof which is permanently connected to a negative source and maintained at a predetermined potential below ground level. Thus the "positive" level referred to frequently throughout this specification is actually at ground potential. Each of the one hundred drive lines or vertical copper strips 404 is numbered along the lower edge of sheet 400 for clarity in illustration.

As noted above in the description of FIG. 9, the fifty-first, fifty-second, fifty-third and fifty-fourth drive lines are connected respectively to AND gates 367, 369, 373 and 375 by cable 405 comprising lines 368, 370, 372 and 376. Other drive lines are connected to various logic circuits through cable 406 and to the several relay coils through cable 407.

It will be seen in FIG. 10 that the horizontal copper strips 402 appear to intersect with the vertical copper strips 404. Actually, as shown in FIG. 11, the horizontal strips 402 are spaced forwardly of the vertical strips 404 by a distance equal to the thickness of insulating sheet 400. At each apparent intersection there is provided a hole 408 extending through one of the horizontal copper strips 402, one of the vertical copper strips 404 and also through the insulating sheet 400 therebetween.

Each of these holes 408 is adapted to receive the shank 409 of a diode indicated generally at 410 and comprising enlarged cylindrical handle 411 which enables the diode 410 to be manually manipulated for inserting and removing its shank 409 into and out of a respective one of the holes 408. The shank 409 comprises a pair of conductive portions 412, 413 at the opposite end thereof and an intermediate semiconductor portion 414 having a P-N junction. Conductive shank portion 412 is press-fitted within the hole 408 formed in one of the vertical copper strips 404 to make contact with the latter and the other conductive end portion 413 is similarly press-fitted within the hole 408 in a respective one of the horizontal copper strips 402 to make contact therewith.

It will thus be seen that by manually inserting diodes 410 into any selected group of holes 408 the corresponding drive lines or vertical copper strips 404 will be connected to the respective horizontal copper strips 402 when the latter are energized or raised to the so-called "positive" level by walking ring generator 135. For each of the twenty-five test steps in a particular test sequence the walking ring generator 135 raises to the positive level a respective one of the horizontal strips 402 for a pulse duration equal to the time required to perform a test. These pulses are applied to the horizontal strips 402 in sequence. When each of the horizontal strips 402 is raised to the positive or ground level, those of the vertical strip drive lines 404 which are connected to said energized horizontal strip 402 by the previous insertion of diode 410 will also be raised to the positive or ground level, thereby energizing the logic circuits or relay coils to which the drive lines are connected by cables 405, 406 and 407.

STATION SORT LATCHES

Referring now to FIGS. 13 and 14 there are shown in detail AC and DC station sort latches indicated generally as banks at 131 and 132 in FIG. 6. The function of these latches is to accumulate the individual test results at each station in the form of a sort qualification verdict for transmittal to the sort shift register 13 or 15. Since in the present embodiment, four test stations are utilized on each handler, there are a total of eight such sort latches, four of which are for AC stations and four of which are for DC stations. Since all eight latches are identical only one latch is illustrated in the drawing.

For each test of a sequence, input line 127 of a latch or second means comprising a plurality of circuit means indicated generally at 500 receives the output of differential amplifier 121. Whether line 506 receives a same-polarity or an inverted signal corresponding to the output of differential amplifier 121 is dependent upon whether Exclusive-OR gate 507 is programmed so that it inverts or does not invert the output of amplifier 121 for that particular test. Programming gate 507 is required because a positive output signal from differential amplifier into latch 500 ordinarily represents a failure. If in a specific test a positive output signal is instead to represent a "pass," then by programming gate 507 into the circuit by energizing a drive line 572 the positive signal is inverted to a negative signal.

More specifically, the output of differential amplifier 121 is fed through line 127 into one output terminal 503 of Exclusive-OR gate 507. The other input 504 of Exclusive-OR gate 507 is connected by line 572 to the program plugboard 137. The latter may be programmed to feed a positive signal into Exclusive-OR gate 507. The output of Exclusive-OR gate 507 indicates whether the input on drive line 572 and the input on line 127 from differential amplifier 121 are of the same polarity. A "pass" test result is indicated by the same polarity input signals to gate 507. A "fail" is indicated by opposite polarity input signals to gate 507. If the output of differential amplifier 121 is positive and the signal on line 136 is positive, the output line 506 of Exclusive-OR gate 507 will be negative. If the signal on line 127 is negative and the input from line 572 is negative, the output line 506 of Exclusive-OR gate 507 will be negative. If the output of amplifier 121 is negative and the input from line 136 is positive or vice-versa, the output of Exclusive-OR gate 507 will be positive.

The output from Exclusive-OR gate 507 is a step function and indicates or represents a "pass" or "fail" decision as set forth above. The presence of a positive signal on line 506, if the diode plugboard 137 is correspondingly programmed, indicates a "fail" result of the test which is being conducted. A negative signal indicates a "pass."

The output from the Exclusive-OR gate 507 is connected by line 506 to one input of AND gate 510. The other input of AND gate 510 is driven by a positive sampling pulse on line 511 from tower control 133. AND gate 510 is activated only when there is a positive signal on both line 511 and line 506. The sampling pulse is timed to occur a predetermined delay time after each test is started so that the initial transients will have had time to decay before the actual test measurement is made.

The output signal appearing on line 519 from AND gate 510 is fed simultaneously to the respective input terminals 519 to 525 of seven AND gates 512 to 518 inclusive. The other input terminals 526 to 532 of AND gates 512 to 518 respectively, are connected to drive lines 534 to 540 of drive line cable 541. Depending upon system programming, there will be either a positive or a negative signal present on a particular one of these drive lines 534 to 540. The presence of a positive level activates the respective AND gate of the set 512 to 518 when there is a positive signal output on line 519. The drive signals appearing on drive lines 534 to 540 are controlled by program plugboard 137. Thus, any of the seven AND gates 512 to 518 produces a positive output signal if the respective test is failed, provided that the respective one of drive lines 534 to 540 is programmed for said test.

The outputs from the seven AND gates 512 to 518 are directed by lines 541 to 547, respectively, to input terminals 548 to 554 of latches 555 to 561 inclusive. Each of the latter is constructed as shown at 62 and comprises an inverter 563, an AND gate 564. and an OR gate 565. All latches are initially set by a "start test" pulse to inputs 548 to 554 before the series of tests is performed on a chip. A "fail" test result resets the corresponding latch, changing its output from a positive level to a negative level. A "pass" result does not affect the set condition. The lines 581 to 587 drive the sort shift registers. After all tests are complete, a positive level on any particular line of the set 581 through 587 indicates that the chip has passed all tests performed at the respective station required to qualify for the sort corresponding to that line.

In other words, the output lines 581 to 587 produce $m$ out of $n$ output signals indicative of a priority sort classification, where $m$ equals, $1, 2 \ldots n$.

SORT SHIFT REGISTER

Figure 16:
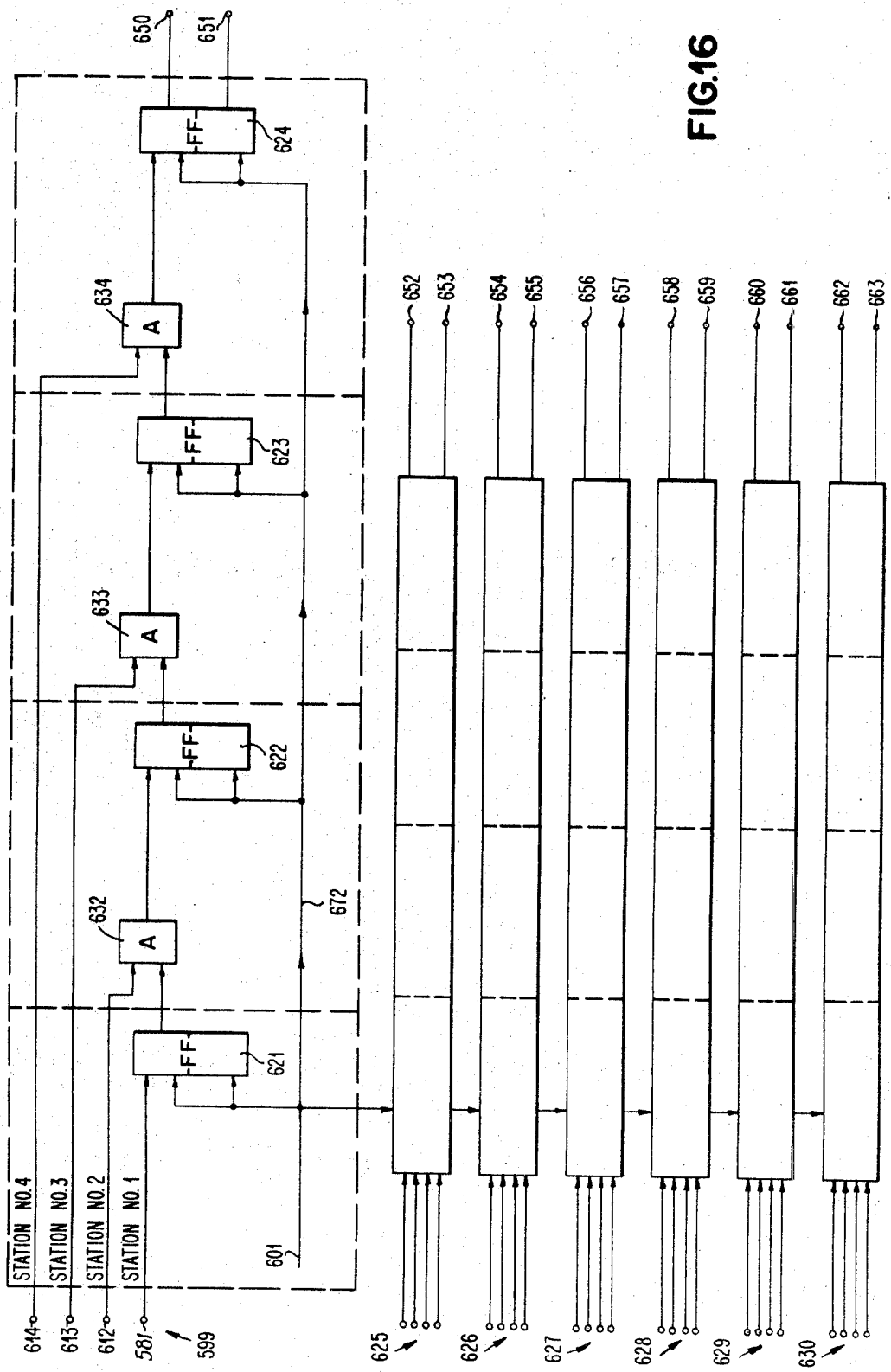
FIG. 16 shows the circuitry of the sort shift register.

FIG. 16 shows a shift register for accumulating the results of individual tests on a given transistor or diode chip. This register, designated generally as 599 and hereinafter referred to as the sort shift register, shifts the test results in such a manner as to store information regarding the sorts or categories for which a given clip qualifies after the tests at each station. This information is utilized by a preferential sorting circuit described below to direct the placement of each chip into the highest priority sort for which it finally qualifies after being subjected to the tests at all four test stations. In other words, the sort shift register and preferential sorting circuitry means are responsive to receive from each of the test stations their respective $m$ out of $n$ output signals, indicative of a priority sort classification, so as to dispense the electrical devices or components in accordance therewith.

At each of the four test stations of one of the handlers a decision is made as to whether or not the chip passed the tests required for qualification for each of seven possible sorts or categories. The chip must pass all tests for a given sort at each and every one of the four test stations in order for the chip to be qualified for that particular sort. When the tests are complete at the fourth and final testing station, the chip is placed into the container corresponding to the highest priority sort of all the sorts for which it qualified at each of the four test stations.

Referring now to FIG. 16 in more detail, each of sort shift registers 13, 14 comprises twenty-eight flip/flop stages arranged in an array of seven horizontal rows and four vertical columns. Each of the seven rows corresponds to a respective one of the seven possible sorts and each of the four columns corresponds to a respective one of the four test stations. Since all stages of the sort shift register are identical, only the top row, representing Sort No. 1, is shown and described in detail. The remaining rows representing Sorts Nos. 2 to 7 inclusive, are shown schematically and indicated generally by the reference numerals 625 to 630, respectively.

Operation of the sort shift register may be understood by following the tests on a single chip for the row corresponding to Sort No. 1 through all four test stations. When a chip is placed in Test Station No. 1, and the tests at that station are complete, an input line 581 of sort latch circuit 131 (FIG. 13) is at a positive potential if the chip passes all the tests for Sort No. 1, and is at a negative potential if the chip fails any of the tests required to qualify for Sort No. 1. When the tests at the remaining three stations are complete, an "end of tests" signal from system control is applied to input line 601 to cause a positive pulse to be applied to the gating inputs of all twenty-eight flip-flops of the sort shift register, including flip/flop 621. This positive signal causes each flip/flop including 621 to switch to its "on" condition if its input (such as at 581 for flip/flop 621) is positive or switch to its "off" condition if its input is negative, regardless of the initial condition of each flip/flop.

If it is assumed that the chip under test passes all tests for Sort No. 1 at Station No. 1, flip/flop 621 will be in its "on" condition after being triggered. The output of flip/flop 621 thus will be at a positive level to activate AND gate 632. The remaining six rows 625 to 630 corresponding to the other six sorts of Station No. 1 are activated simultaneously with the first row corresponding to Sort No. 1. After the tests are completed at Station No. 1, the chip handler is indexed and the chip moves to Station No. 2 in a manner described below. At Station No. 2 the chip is subjected to a different set of tests.

If at Station No. 2 the chip passes those tests required for qualification in Sort No. 1, a positive signal is applied to input line 612 leading to one input of AND gate 632 whose other input is energized by flip/flop 621, thereby activating AND gate 632 to cause the output of AND gate 632 and therefore also the input of flip/flop 622 to be at a positive level.

When all tests at all four stations are finished, the "end of tests" signal on line 601 applies a gating signal on line 672 to all flip/flops, causing them to change states according to their input condition. This process is repeated at test Stations Nos. 3 and 4. If the transistor passes the required test at all four stations for Sort No. 1, output terminal 650 of the last flip/flop 624 is at a positive potential. A preferential sorting means described below will then place the chip into the Sort No. 1 container.

If the chip does not qualify for Sort No. 1 at any of the four test stations the polarities of output terminals 650, 651 will be reversed to actuate the preferential sorting means to place the chip in the highest priority sort of all the sorts for which it does qualify, as will be explained below. That is, if the chip fails to pass the tests for Sort No. 1 at any one of the four testing stations, all of the subsequent sort shift register stages following the stage representing the test station at which the failure occurred, are switched to the "off" condition. For example, if the chip fails to pass the Sort No. 1 tests at Station No. 2, the signal on input line 612 is negative and does not satisfy AND gate 632. This causes flip/flop 622 to be switched to its "off" condition when the gating pulse from AND gate 603 is applied through line 672. The output from flip/flop 622 is therefore negative making it impossible to activate AND gate 633. Thus, after the next test sequence at Station No. 3, flip/flop 623 is switched to its "off" condition regardless of the condition of input 613. Similarly, regardless of the results of the tests at Test Station No. 4, flip/flop 624 will be switched to its "off" condition, so that output terminal 650 will be negative and output terminal 651 will be positive. The preferential sorting control 14 or 16 will then respond in a manner now to be described.

PREFERENTIAL SORTING CONTROL

Figure 17:
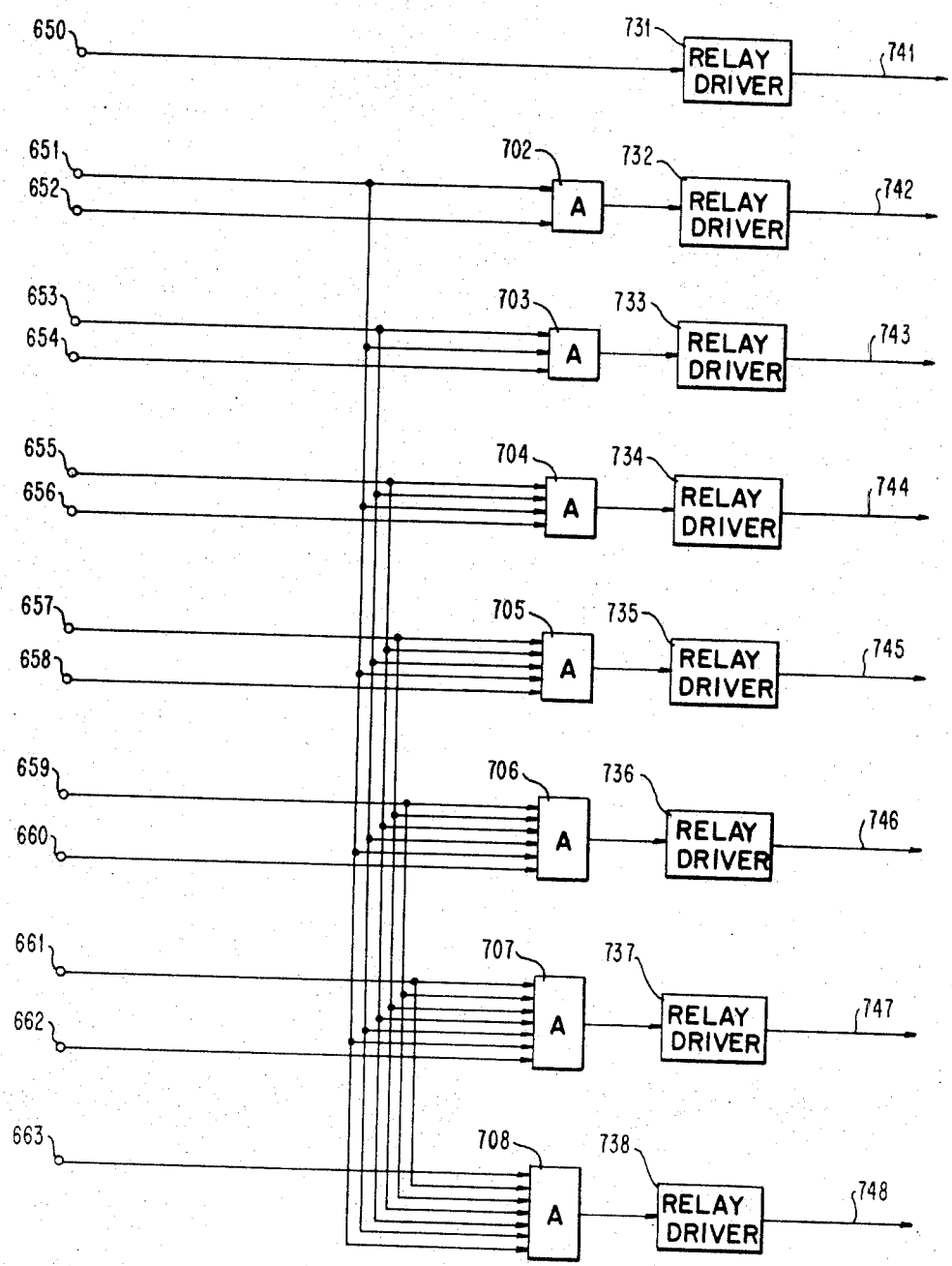
FIG. 17 shows the penferential sorting control.

Referring now to FIG. 17 the preferential sorting circuits 14 and 16 are shown therein in detail. Each of preferential sorting circuits 14, 16 comprises seven AND gates 702 to 708 inclusive and eight relay drivers 731 to 738 inclusive. The seven pairs of input lines 650 to 663 inclusive are the respective pairs of output lines of the sort shift register shown in FIG. 16 with the same reference numerals. For example, the output lines 650 and 651 of FIG. 16 correspond to the input lines 650 and 651 of FIG. 17 respectively. Each pair of input lines corresponds to a sort. For example, the input line pair 650, 651 corresponds to Sort No. 1, and the input line pair 662, 663 corresponds to Sort No. 7.

The input lines of each pair complement each other so that when one is at a positive potential the other is at a negative potential. For example, when input line 650 is at a positive potential input line 651 is at a negative potential, and when input 662 is at a positive potential input line 663 is at a negative potential. The lower numbered input line of a pair will be at a positive potential if a chip under test has passed all the tests for the respective sort at all four test stations. The higher numbered input line of each will be positive if the chip under test fails to pass the test of the respective sort at any one of the four test stations.

Thus, if a chip under test passes all of the tests for Sort No. 1 at all of the test stations, input line 650 will be at a positive potential and its complementary line 651 will be at a negative potential. The positive potential on input line 650 will energize relay driver 731 sending a signal to the chip handler on output line 741. This output signal will cause the handler to dispense the chip under test into the Sort No. 1 container. The complementary negative signal on input 721 will inhibit all of the AND gates 702 to 708 inclusive, so that none of the output lines 742 to 748 inclusive, corresponding to the lower priority sorts, can be energized.

If the chip under test fails to pass one or more of the Sort No. 1 tests, input line 650 will be at a negative potential and input lines 651 will be at a positive potential. This will not energize relay driver 731, but will energize one input of AND gate 702. If the chip has passed the Sort No. 2 test, input line 652 will be at a positive potential to energize the other input of AND gate 702 thereby energizing relay driver 732 to provide a signal on output line 742. The latter causes the chip handler to dispense the chip into the Sort No. 2 container.

It will be seen that when a chip passes all the tests of a given sort, the input lines to the preferential sorting control representing that sort will inhibit all of the AND gates corresponding to sorts having a lower priority than the given sort. For example, if a chip passes the tests of Sort No. 4, the line 657 will be at a negative potential thereby inhibiting AND gates 705 to 708 inclusive. If said chip has also failed to qualify for the first three sorts, the positive potential on input lines 651, 653, 655 and 656 will activate AND gate 704 to energize relay driver 734 and thereby provide a signal on output line 744 thereby causing the chip to be placed in the Sort No. 4 container. If the chip fails to qualify for any of the seven sorts, AND gate 708 will be activated to energize relay driver 738 and thereby provide a signal on output line 748 to cause the chip to be placed in a "reject" container.

TRANSIENT RESPONSE TESTING

The means by which the subject apparatus performs certain transient response tests upon a transistor chip will now be described.

Figure 18:
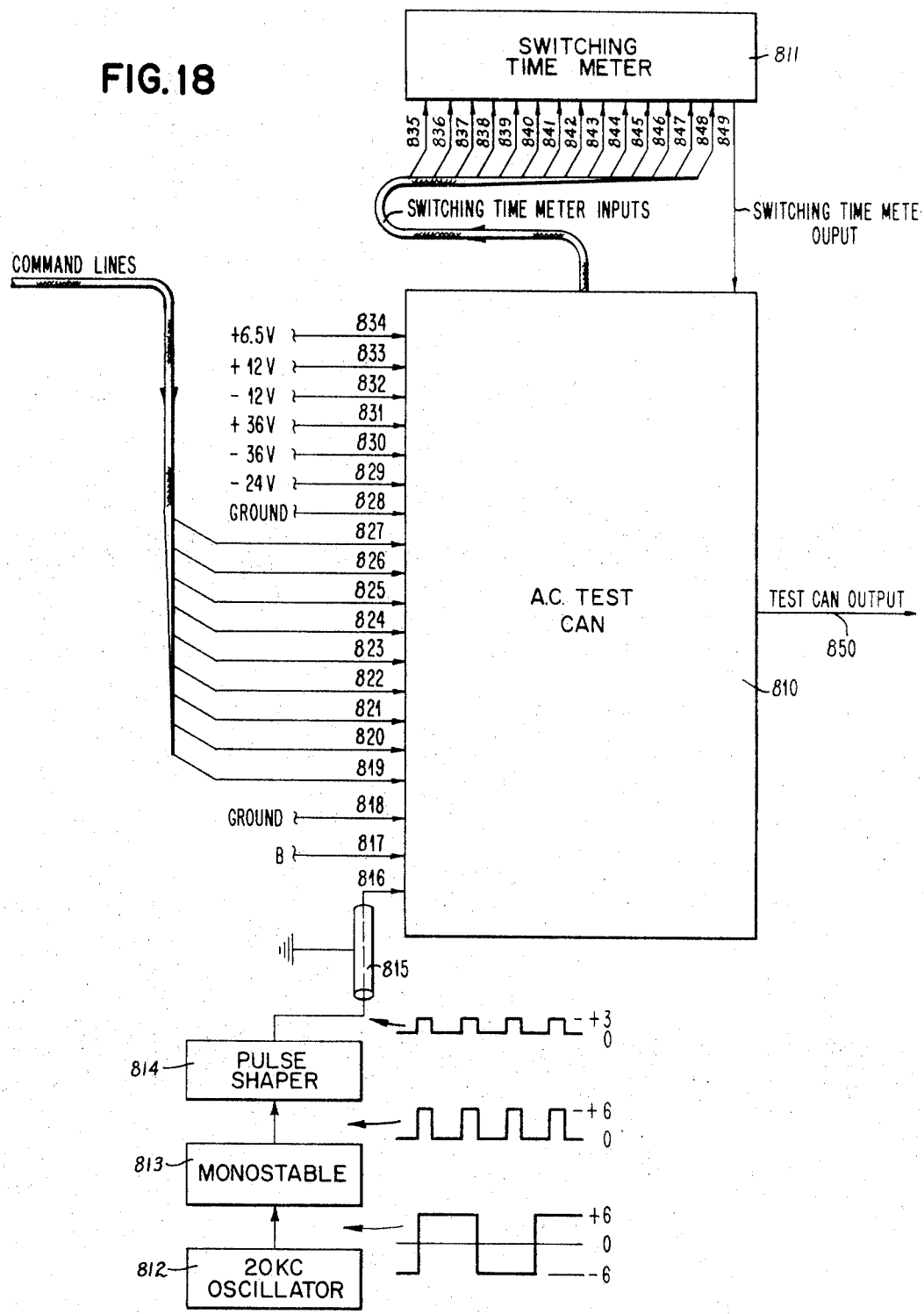
FIG. 18 shows an AC test can and circuitry associated therewith.

FIG. 18 shows an AC test can 810, a switching time meter 811, and the inputs and outputs thereof. The can requires +6.5 volts, +12 volts, −12 volts, +36 volts, −36 volts, and −24 volts as power inputs from the system. These inputs are represented in FIG. 18 by functional lines 828 to 834. Nine drive lines from the diode program plugboard enter the test can 810 as represented by functional lines 819 to 827. Each of the drive lines, when activated, drives a different relay bank within the test can 810. All of the coils within the test can 810 have one end connected to −24 volts and the other end connected to the respective drive lines. The order in which these drive lines are activated is a function of the program plugboard and will control the order of the tests performed within the can. A special "B" signal drive line represented by functional line 817 is a required test drive line input. The nature of this special B drive line 817 and the purpose thereof will become clear after a description of the test can operation.

A 20 kilocycle stimulus pulse on line 816 is required for all tests performed within the test can 810. Thus the stimulus is provided to the can throughout the multiplexing of the AC tests performed within. The generation of the stimulus pulse on line 816 is also illustrated in FIG. 18. A 20 kilocycle oscillator 812 is connected to monostable multivibrator 813 which shapes the pulse so that it obtains the required duty cycle and the proper lower DC level. A pulse shaper 814 improves the pulse rise time (less than 2 ns.) and provides the proper upper DC level. This pulse is connected to the test can 810 through transmission line 815. The function of this stimulus pulse will become clear after a description of the test can operation.

The output of test can 810 appears on a single line 850 which is connected to tower 3 or 4. The output line 850 is a DC voltage proportional to the performance of the device under test. This DC voltage will change with the test multiplexing so that the output line 850 will provide analog information relating to the particular device parameter tested during any given drive line signal. The switching time meter 811 is positioned on top of test can 810. It receives the base and collector voltages of the device under test within the test can 810, and converts this into analog information. The output of the switching time meter 811 is connected to the test can 810 as shown by functional line 849. The meter output is connected to the test can output 850 while some of the tests are performed, but undergoes further processing within the test can 810 during the performance of other tests. The switching time meter 811 is a conventional EH Research Model 143 of well-known construction and manufactured by EH Research Laboratories of Oakland, Calif. The operation of the test can 810 and the switching time meter 811 will be made clear after further description. In the discussion below, the polarities are stated with the assumption that the transistor under test is of NPN type.

Figure 19:
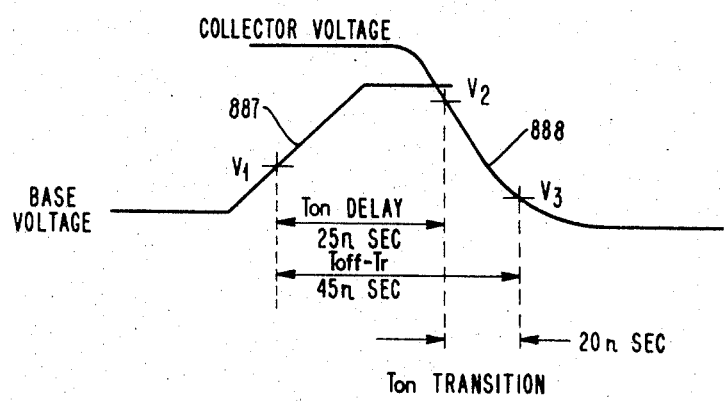

The device under test may be tested for the following parameters: turn-on time delay, turn-off time delay, storage time, turn-on transition time delay, and turn-off transition time delay. The definitions of these terms as utilized hereinafter may be best understood by referring to FIGS. 19 to 21. The turn-on time delay FIG. 19 is the time required for the voltage at the collector of the device to fall from the supply voltage to a predetermined specified level $V_2$ after the base drive has reached a predetermined specified level $V_1$. Thus, if waveform 887 is the base drive turning on the device under test, and waveform 888 is the collector voltage of the device so driven, the turn-on delay is the time represented by the legend "$T_{on}$ DELAY" in FIG. 19.

The turn-off delay (FIG. 20) is the time required for the voltage at the collector of the device to rise to $V_5$ at a predetermined specified percentage of the collector supply voltage, after the base drive voltage has dropped to a predetermined specified level $V_4$. If waveform 889 is the base drive turning off the device under test, and waveform 890 is the collector voltage of the device so being turned off, the turn-off delay is the time represented by the legend "$T_{off}$ DELAY" in FIG. 20. The storage time (FIG. 21) of the transistor under test is the time required for the transistor to begin to rise to $V_8$ from its saturation voltage, after it has been cut off by a negative-going base voltage drive having a fall time (to $V_7$) which is small compared to the switching capability of the transistor under test. If waveform 891 represents such a base drive, and waveform 892 represents the collector voltage of a transistor so driven, the storage time is the time represented by the legend "STORAGE TIME" shown in FIG. 21.

Typical waveforms which might be used to drive the transistor under test, as an illustrative series of AC tests, are as follows: a turn-off base drive falling from 1.5 volts to 300 millivolts with a fall time of 25 ns., a storage time base drive falling from 5.0 volts to −1.0 volt with a fall time of less than 5 ns., and a turn-on base time rising from 300 millivolts to 3.50 volts with a rise time of 10 ns. Controls are available within the test can such that the up and down levels, as well as the rise or fall times of each of these waveforms, are continuously adjustable by means within ramp generators which will be described below.

The turn-on transition time delay (FIG. 19) is the time required for the collector of the transistor 860 under test to fall from some predetermined specified voltage $V_2$ below the supply voltage to another predetermined specified voltage $V_3$ above the saturation voltage, after the base turn-on drive has been applied to the transistor 860. The turn-on transition time delay of the transistor having a collector waveform as shown by 888 is represented by the legend "$T_{on}$ TRANSITION" in FIG. 19. The turn-off transition time delay (FIG. 20) is the time required for the device to rise from some voltage $V_5$ above the saturation voltage to some other predetermined voltage $V_6$ below the collector supply voltage, after being driven by the turn-off base drive. The turn-off transition time delay of the device having a collector voltage 890 is shown by the legend "$T_{off}$ TRANSITION" in FIG. 20.

Figure 22:
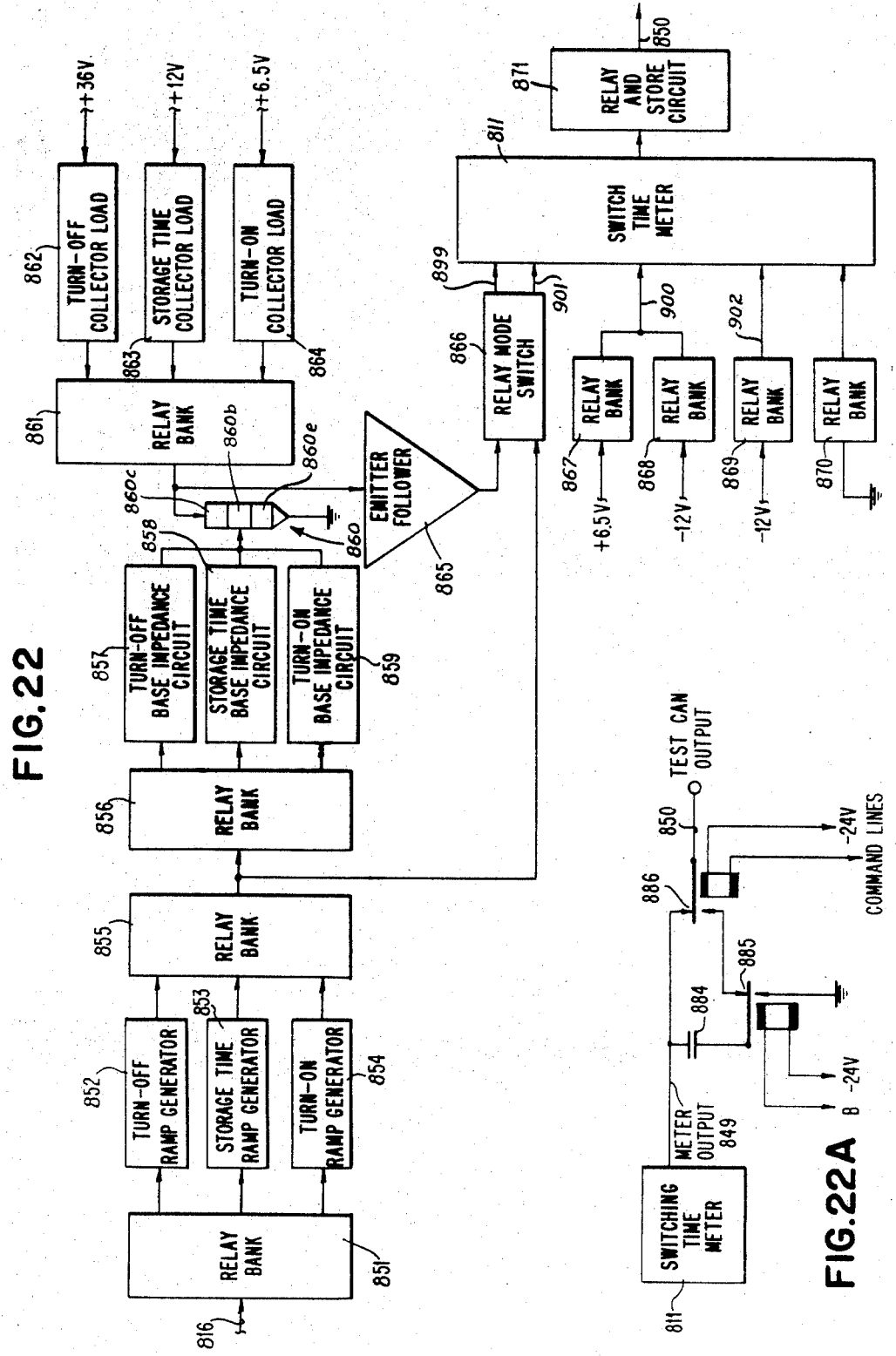
FIG. 22 shows schematically the circuitry within and associated with each AC test can.

The operation of the test can 810 may be understood by referring to the diagram of FIG. 22. The stimulus pulse on line 816 is transmitted to relay bank 851. Thus the stimulus pulse will pass through the relay contacts (not shown) of bank 851 and drive one and only one of the three ramp generators 852, 853 or 854. The ramp generator to which the stimulus pulse is connected is dependent upon the test being performed which is controlled by the drive lines entering the relay bank 851 which are activated at that time. The contacts (not shown) of relay bank 855 are controlled by the same drive lines controlling those of relay bank 851. The contacts of relay bank 855 are arranged such that the output of the particular ramp generator receiving the stimulus pulse is connected to the rest of the subsystem within the test can, and the outputs of the other two ramp generators are open circuited. In this manner relay banks 851 and 855 connect only that ramp generator which is to be utilized for the specific test being performed and isolate the other two ramp generators.

Relay bank 856 connects the proper input impedance to the base 860b of transistor 860, the transistor under test. Thus for a turn-off test, the output of the turn-off ramp generator 852 will be connected through the input impedance 857 to the base 860b of the transistor 860. Similarly, ramp generator 853 will be connected to the base 860b of transistor 860 through impedance 858 during a storage time test, and ramp generator 854 will be connected to the base 860b of transistor 860 through impedance 859 during a turn-on test. Relay bank 861 connects the proper load and bias to the collector 860c of the test transistor 860. Thus during a turn-off test its contacts are such as to connect the load 862 to the transistor collector 860c, the load 863 to the collector 860c during a storage time test, and the load 864 to the collector 860c during a turn-on test. The contacts within relay banks 856 and 861, as well as the contacts of all relay banks hereinafter mentioned, are controlled by their respective drive lines as were the contacts of relay banks 851 and 855 previously described. The emitter 860e is grounded as shown.

In this manner, relay banks 851, 855, 856 and 861 multiplex specified circuit connections and drives to the device 860 for each test performed within the test can 810. The following discussion pertains to the manner in which the switching time meter 811 acting with the test can 810 transforms the output response of the device 860 under test into useful analog information.

Figure 23:
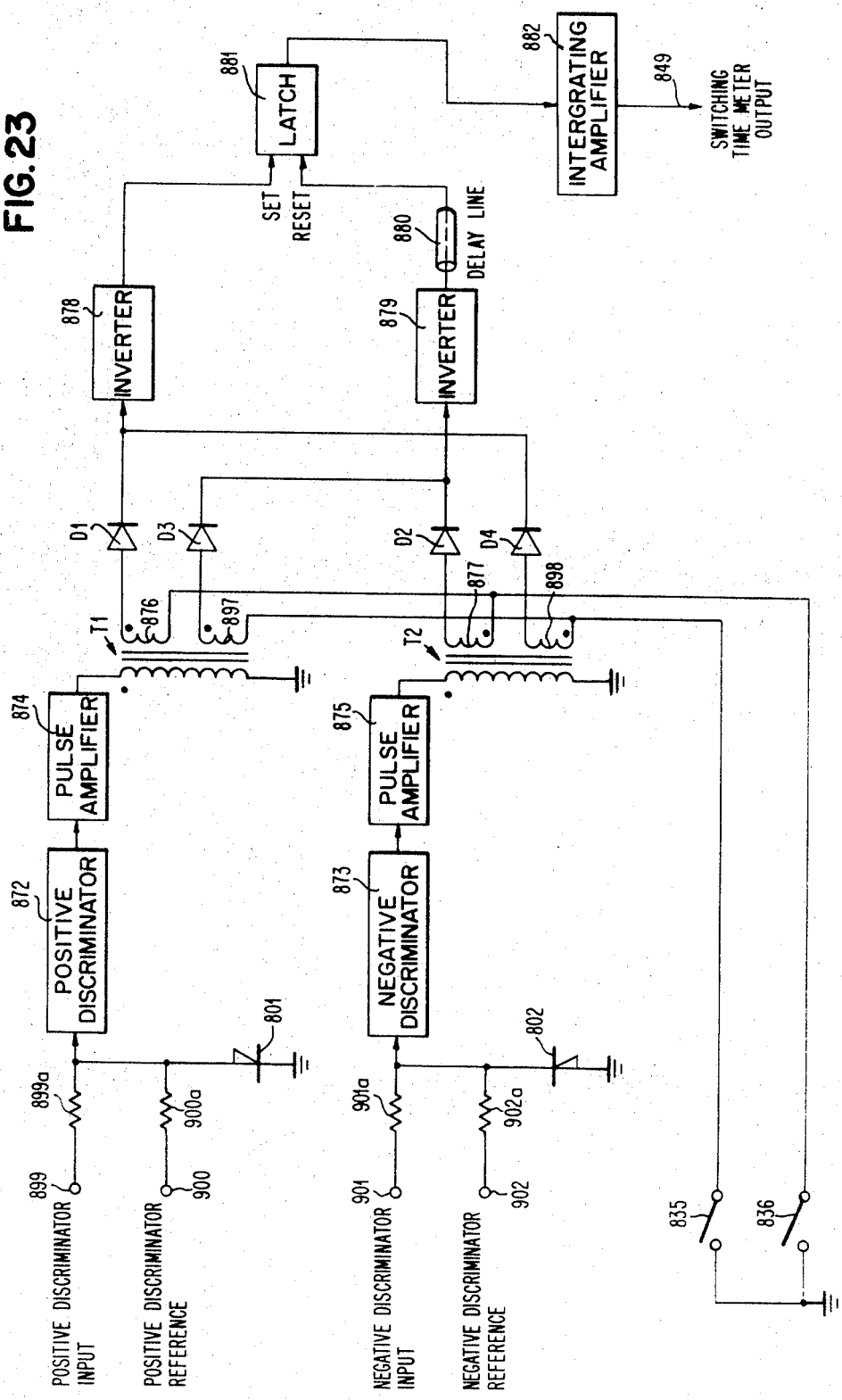
FIG. 23 is a schematic view illustrating the operation of the switching time meter.

The switching time meter 811 responds to a preset value of base voltage, a preset value of collector voltage, and supplies an output voltage proportional to the time between the occurrence of these two preset values. By referring to FIG. 23, the operation of the switching time meter 811 may be understood. The meter has two modes of operation which are controlled by relay bank 870. The contacts of relay bank 870 switch the mode of operation by grounding one of the switch inputs 835 or 836 of the switching time meter as shown in FIG. 23. For example, if switch 836 is closed and switch 835 is open, secondary windings 876 and 877 of transformers T1 and T2, respectively, will be connected to the circuit while windings 897 and 898 are isolated from the rest of the circuit.

Under these conditions, the switching time meter 811 will operate as follows. A positive-going signal from the AC test can is connected to the meter input 899 and drives the positive discriminator 872 through a 1K resistor 899a. When this positive-going input reaches the predetermined level, positive discriminator 872 will transmit a pulse which will be amplified by pulse amplifier 874. The amplified pulse will be coupled through transformer T1 and diode D1 to drive inverter 878 which is connected to the secondary winding 876. The output of inverter 878 will set the latch 881. When set, the output of the latch 881 will be a positive DC level which will remain at that level until the latch 881 is reset by a reset pulse transmitted through the 25 ns. delay line 880.

This reset pulse is derived from a negative-going input signal on line 901 which extends from the test can 810, in a manner similar to that in which the set pulse was derived from the positive-going input applied to line 899. That is, a pulse will be transmitted from the negative-going discriminator 873 in response to attainment of a predetermined level by the negative-going waveform at input line 901. This pulse is amplified by amplifier 875, and coupled to the input of inverter 879 through the transformer T2, in particular through the secondary winding 877 and diode D2. The pulse appearing at the output of inverter 879 undergoes a 25 ns. delay through the delay line 880 and is then connected to the reset input of latch 881.

In this mode of operation, the positive and negative-going inputs transmitted from test can 810 are the base and collector voltages respectively of transistor 860 as it is being turned on. Since the switching of transistor 860 occurs at the rate of 20 kc., determined by the rate of the 20 kc. stimulus pulse 816, latch 881 is set and reset at a frequency of 20 kc. as the stimulus pulse 816 rises. This setting and resetting of the latch 881 continues during the entire duration of the drive line signal controlling the particular test being performed at the time. Thus, during this operation, the output of the latch circuit is a 20 kc. waveform with a duty cycle or pulse width determined by the time between the occurrence of a preset value of the positive-going input level, and the occurrence of the preset value of the negative-going input level.

This output waveform, the output of the latch 881, is then fed into an integrating amplifier 882. The output signal of the integrating amplifier 882 on line 849, is a DC level proportional to the duty cycle (pulse width) of the waveform at its input. Therefore, the output signal on line 849 is proportional to the time between the occurrence of the two preset levels of the positive and negative-going waveforms entering the input of the switching time meter at 899 and 901, respectively.

The preset values at which the respective discriminators 872, 873 will fire is determined by two other input voltages 900 and 902, which are connected to tunnel diodes 801 and 802, respectively, through 1K resistors 900a and 902a, respectively. These reference voltages determine the value of the discriminator input voltage at which the discriminator will react by adjusting the bias of the respective tunnel diodes.

The other mode of operation is achieved when switch 836 is open and switch 835 is closed. Under these conditions, secondary windings 897 and 898 are connected through diodes D3, D4 to the rest of the switching meter circuit 811, while secondary windings 876 and 877 are now isolated. Under these conditions, T1 will be connected to the input of inverter 879 and T2 will be connected to the inverter of 878. Thus it is seen that the pulse occurring when the predetermined level of the positive-going input swing is reached now resets the latch 881 while that occurring after the preset level of the negative-going swing is reached now sets the latch 881.

Referring again to FIG. 22, it may be seen that the waveforms of the base drive and collector response of transistor 860 are brought to various operative functional blocks and then to the switching time meter 811. The collector response is brought through emitter-follower 865 to mode switch 866 while the base drive of transistor 860 is brought from between the two relay banks 855 and 856 directly to the mode switch 866. Mode switch 866 assures that the positive-going waveform will be connected to the input 899 to thereby drive the positive discriminator, and that the negative-going waveform is connected to input 901 to thereby drive the negative discriminator. For depending upon what test is being performed, the base waveform may either be positive-going or negative-going and the collector waveform will always be of the opposite sense.

For example, relays within mode switch 866 will connect the output of emitter-follower 865 to input 899 such that it will drive the positive discriminator 872 during a turn-off test while the base drive will be connected to input 901 thereby driving the negative discriminator. During a turn-on test, the collector voltage is a negative-going signal and the base drive is a positive-going signal. Thus the relays within mode switch 866 direct the collector voltage to drive the negative discriminator 873 and the base voltage to drive the positive discriminator 872.

Relay banks 867, 868, 869 and the voltages passing through the contacts thereof, determine the tunnel diode bias voltages which appear at the reference inputs 900 and 902 and set the decriminator input levels at which the discriminators react. These relay contacts are connected to resistive voltage dividers such that reference voltages may be multiplexed in accord with different specifications for each of the tests performed. These resistive voltage dividers are partially composed of variable resistors such that multiplexed reference voltages may be preset through a continuous variable range pursuant to the device specification. Relay bank 870 connects the proper secondary windings of transformers T1 and T2 within the switching time meter 811 as previously described. It is essential that relay bank 870 and mode switch 866 work in conjunction with each other such that the base drive sets the latch 881 whether it is a positive-going or negative-going waveform, and the collector signal resets the latch 881 whether it is a positive-going or negative-going waveform. For example, during a turn-off test, mode switch 866 will connect the base drive voltage such that it drives the negative discriminator 873 and relay bank 870 will connect the pulse from the negative discriminator 873 to the reset of the latching circuit 881.

Figure 20:
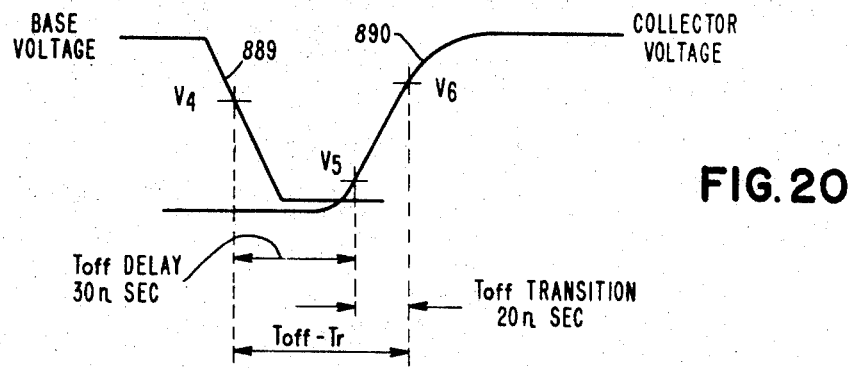
FIG. 20 shows the base and collector voltage waveforms for a transition measurement during turn-off.
Figure 21:
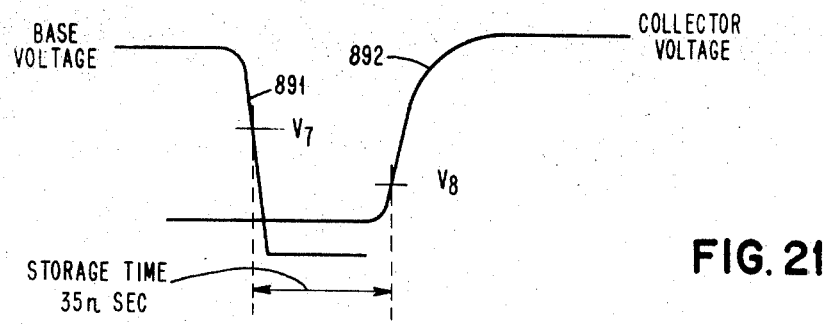
FIG. 21 shows the base and collector voltage waveforms for a stoarge time measurement.

In this manner analog information relating to the turn-on and/or the turn-off time delay of the device under test is obtained from the test can 810 and switching time meter combination. Waveforms 887 to 892 of FIGS. 19 to 21 illustrate a response of a typical transistor under test. The output 849 of the switching time meter 811 will be a voltage proportional to the 25 ns. turn-on time delay shown for waveforms 887 and 888. The specific voltage values indicated by $V_1$ through $V_8$ are the input values at which the discriminators 872 and 873 will fire. These values are preset and multiplexed by switching the bias of tunnel diodes 1 and 2 as previously described. For the turn-on test, base voltage 887 will set the latch 881 by firing the positive discriminator 872 after base voltage 887 reaches the value indicated by $V_1$. The latch 881 will be reset 50 ns. later (25 ns. of turn-on time delay plus 25 ns. of fixed latch reset delay through the delay line 880) through the negative discriminator, by collector voltage 888, when collector voltage 888 reaches the preset value indicated by $V_2$. Similarly, analog information relating to the turn-off delay of the typical device under test may be obtained as a voltage proportional to the 30 ns. turn-off time delay shown between waveforms 889 and 890. For this test, relay bank 870 and mode switch 866 are such that the base voltage 889 sets the latch 881 through the negative discriminator 873 and the collector voltage 890 resets the latch 881 through the positive discriminator 872.

The storage time of the device under test is measured smilarly to that of the turn-off time. The difference between these two tests resides in the circuit conditions connected to the transistor 860. The conversion of the transistor reaction, under such circuit conditions to useful analog information, is by the same operation utilized with the turn-off test. The output of the storage time ramp generator 853 has a larger amplitude and faster fall time than that of the turn-off ramp generator 852. Thus the difference in time between the set and reset of the latch 881 will be the time required to pull transistor 860 out of saturation.

An output signal proportional to the transition time of the transistor may be obtained with the same switching time meter 811 utilized for the other operations. This is accomplished by multiplexing the switching time meter through the utilization of the circuit contained in block 871 of FIG. 22. Referring to waveform 888, we can see that the turn-on transition time delay may be determined by performing two successive turn-on tests. If the required turn-on time delay is determined (e.g. 25 ns. for a typical device under test) and then the turn-on time is determined (45 ns. for a typical device), the two times may be subtracted and the difference will be the turn-on transition time required. In a similar manner, the turn-off transition time may be found by taking two successive turn-off times as illustrated for the base and collector waveforms 889 and 890.

Thus for a transition time measurement, the switching time meter 811 determines two successive time intervals, and provides two successive voltages proportional thereto. Each of these measurements are made in response to two independent drive line signals. During the first of these drive line signals, the output line 850 of block 871 will be connected directly through its input line. Thus output 850 of test can 810 contains the analog information relative to the turn-on time delay of the device. During the second drive line signal, a turn-on time measurement is made, and the output voltage of the switching time meter 811 will change to a value proportional to this second time measurement. Circuit 871 then operates on the two successive voltages such that its output voltage on line 850 is the difference between the value of the first and second input voltages. This difference is directly proportional to the difference between the two intervals, and will therefore be a measurement of the transition time of the device under test.

Figure 24:
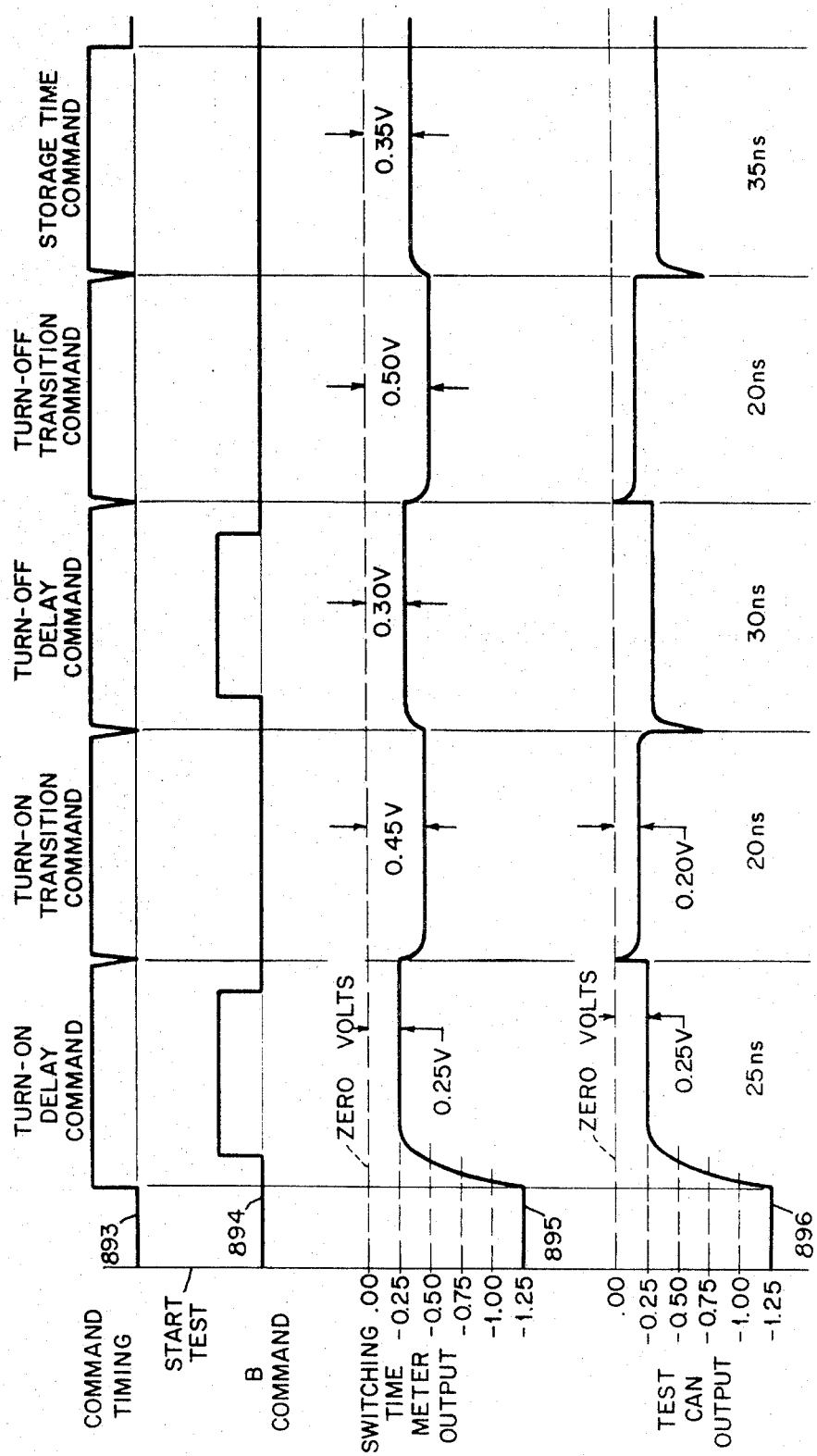
FIG. 24 shows the timing, command meter output, and test can output waveforms during a sequence of multiplexed transient response measurements.

The circuit within block 871 is shown schematically in FIG. 22A. This circuit provides a means for measuring differences between two successive voltages which appear in response to successive timing pulses. The pertinent waveforms are shown in FIG. 24. Command signal 893 connects the output 849 of the switching time meter 811 to the input of the circuit block 871 as the first turn-on time delay measurement is made. At this time the input line of the circuit 871 is connected directly through to its output line due to the unactivated state of relay 886. The waveforms of the input and the output of the circuit are thus identical as shown by 895 and 896, respectively. While the switching time meter 811 is so connected to the circuit 871, the special control pulse B activates relay 885 so that the positive side of capacitor 884 is connected to ground. Thus capacitor 884 will charge to a voltage equal in magnitude to the input of the circuit 871, which is of course, the output of the switching time meter 811. Before the end of this first turn-on delay, drive line signal B ends such that relay 885 returns to its unactivated position. This will place capacitor 884 in an incomplete circuit so that it will remain charged at the original input voltage.

The second drive line signal connects the second output of the switching time meter 811 to the input of the circuit 871 and activates relay 886. With relay 886 activated, the voltage appearing at the output of circuit 871 is equal to the sum of the voltage presently at the input of the circuit 871 and the voltage across the capacitor 884. Since the voltage across the capacitor 884 is equal to the first output of the switching time meter and of a polarity to oppose the present input of the circuit 871, and the voltage at the input is equal to the second output of the switching time meter, the voltage appearing at the output of the circuit 871 is the difference between the first and the second outputs of the switching time meter 811. As previously described, this difference in voltage will be proportional to the transition time of the transistor 860 under test. The output during this transition measurement is shown by waveform 896.

The turn-off transition time test is performed in a like manner. The two successive outputs of the switching time meter 811 will be voltages proportional to the two turn-off times shown for waveforms 889 and 890. Circuit 871 will operate in the same manner as it did when the two voltages representing the turn-on delay times were previously connected to its input. Thus, during the turn-off drive line signal, the output of circuit 871 is connected to its input, and the output appearing on line 850 is analog information relating to the turn-off time delay of the transistor 860.

As is seen from the waveforms 895 and 896 during this signal, the amplitude of the switching meter output 849 and the test can output 850 are equal. Again, the special B command will occur during the turn-off delay signal. During the turn-off transition drive line, the output of the meter is proportional to the second turn-off time measurement and is shown by the 500 millivolt amplitude of waveform 895 during that command. Again during this command, the output of circuit 871 is equal to the difference in voltages between the first and second outputs of the switching time meter 811. This is represented during the turn-off transisition drive line signal, by the amplitude of the waveform 896 which is 200 millivolts at this time.

The switching time meter is scaled such that the relationship between the output voltage and the time being measured is 10 millivolts per nanosecond. Thus, as shown by waveform 896, the 250 millivolt output during a turn-on signal represents a 25 ns. turn-on time delay, the 200 millivolt output during the turn-on transition signal represents 20 ns., the 300 millivolt output during the turn-off delay command represents a 30 ns. turn-off time delay, the 200 millivolts shown during the turn-off transition command represents 20 ns., and the 350 millivolts during the storage time drive line signal represents the storage time of 35 ns. It is to be understood that these values are merely illustrative of a typical device performance.

The particular order of cycling shown in FIG. 24 (turn-on delay, turn-on transition, turn-off transition and storage time) is illustrative of one of the orders that may be programmed by the program plugboard of each tower 3 or 4 of the system. It is not necessary that all the tests shown be performed, nor that they all be performed in the order shown. However, a turn-on transition time delay test must follow a turn-on delay test, and a turn-off transition time delay test must follow a turn-off time delay test. This is necessary because the transition time information is obtained from the subtraction of two successive turn-on measurements. The first of these measurements provides the actual turn-on delay time required, while the second is utilized to provide the transition time.

Figure 25:
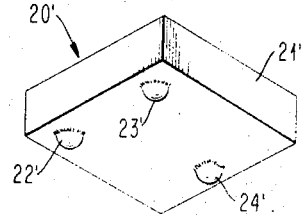
FIG. 25 is an isometric view of a characteristic semiconductor device.

Referring now to FIG. 25, a semiconductor device of the type which may be handled by the invention is chip-type transistor 20' having chip body 21' of a semiconductor material such as silicon or germanium, and protruding contacts 22', 23' and 24'. These contacts not only provide electrical connections to the base, collector and emitter junctions of transistor 20', but also by virtue of their physical characteristics, prevent chip body 21' from touching a surface upon which the transistor is placed. In actual size, transistor 20' may approximate .025 inch on a side and the spacing between contacts 22', 23' and 24' may approximate .015 inch. Each contact may have a diameter of .005 inch. As can be seen, continuous handling and testing of such small elements is a formidable problem.

OVERALL DESCRIPTION OF SEMICONDUCTOR CHIP HANDLER

Figure 26:
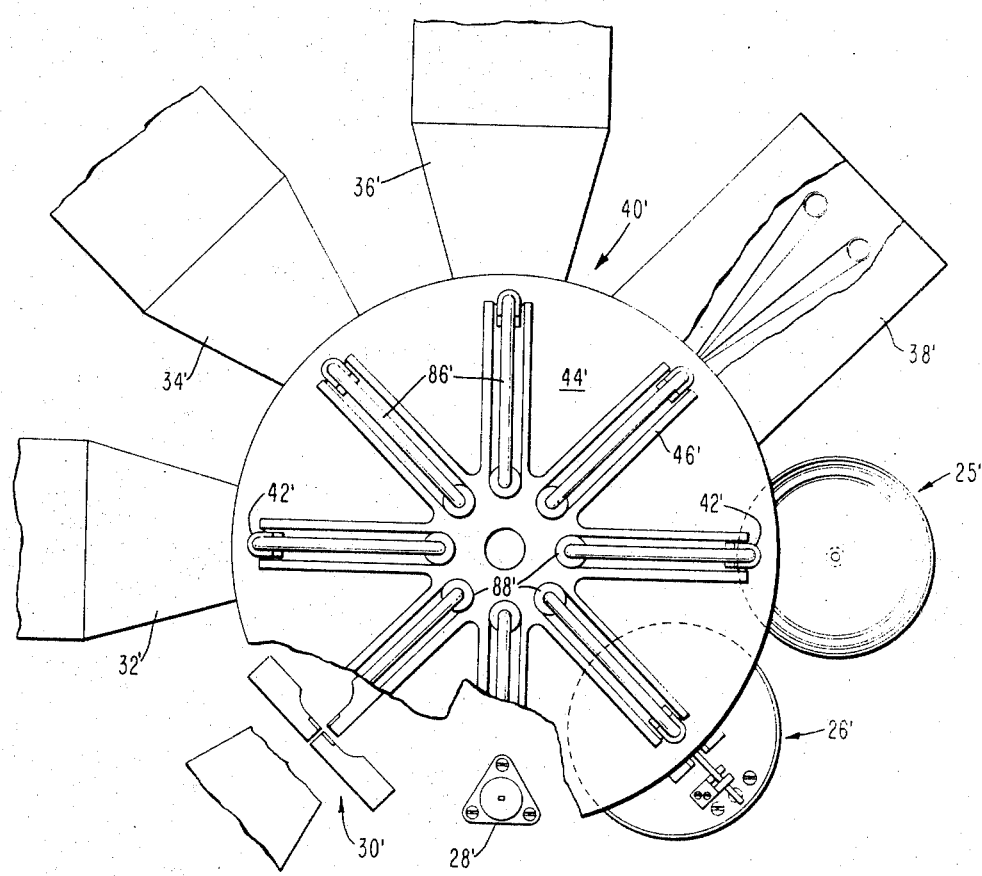
FIG. 26 is a plan view of a semiconductor device handler and tester which forms the subject of this invention.

As shown in FIG. 26, the chip handler and tester includes eight stations—vibratory feed bowl 25', chip orientation sensor 26', chip orientor 28', chip contractor and test station 30', additional test stations 32', 34', and 36', and vacuum sorter 38'. Indexing head 40' provides the means for moving the chips from station to station. The portion of indexing head 40' which transports the separate chips are eight vacuum pencils 42' (FIG. 27). Each vacuum pencil 42' is adapted, when a vacuum is applied to it, to hold a chip and to transport it between stations.

Before proceeding to a more detailed description of the indexing system, the following summary of operations performed by each of the stations will be helpful in understanding the overall operation of the system. Vibratory feed bowl 25' performs the function of providing chips to a pick-off point in a queued-up, contacts-down orientation. While the ultimate desire is to test each semiconductor chip, this cannot be done unless the chip's contacts are arranged in a manner which allows them to be contacted by a test station. Vibratory feed bowl 25' is incapable of assuring this required preset orientation. Accordingly, vacuum pencil 42' picks a chip at the pick-off point and carries it to chip orientation sense station 26' which upon receiving the chip, determines the orientation of the distinctively located protruding contact (in this case, contact 24). A signal is produced indicating the sensed orientation and is transmitted to semiconductor chip orientor station 28'. When vacuum pencil 42' next places the chip in chip orientor 28', the chip is rotated to the desired orientation while still held by vacuum pencil 42'. When the chip has been oriented, vacuum pencil 42' transports to it test station 30' where specially mounted contact arms connect contacts 22'–24' to test circuitry. At subsequent test stations, an identical contact mechanism is provided for succeeding test circuits. The results of the tests are fed to vacuum sorter 38' which takes the chip from vacuum pencil 42' and via a selectively applied vacuum places it in an orifice in accordance with the test results.

Turning now to an overall description of the handler (FIG. 27) indexing head 40' includes two separate portions, indexing disk 44' and pencil retracting head 46'. Fixedly mounted in indexing disk 44' are a plurality of vacuum pencil holding bushings 48'. Slidably mounted within each of bushings 48' is a hollow vacuum pencil 42'. Each pencil 42' is provided with a collar 50' which is spring biased to bear against surface 52' of retracting head 46'. The adjustment of collar 50' the lowermost orientation of vacuum pencil 42'. As will be seen hereinafter, while both indexing disk 44' and pencil retracting head 46' rotate in the process of moving the vacuum pencils from station to station, pencil retracting head 46' is additionally impelled upwardly and retracts the tip of vacuum pencils 42' to disengage the held chips from the respective stations and allow them to clear all obstacles between stations.

Indexing disk 44' is rigidly attached to shaft 54' which is in turn connected to indexing mechanism 56'. Indexing mechanism 56' is powered by shaft 58' which is in turn connected to a motor or other source of rotary power (not shown). The details of indexing mechanism 56' are not shown since such items are commercially available. Basically, such a mechanism provides an intermittent rotary motion to shaft 54' via cam and multiple-follower arrangement. One source of such mechanisms is the Commercial Cam and Machine Company, Chicago, Ill.

In FIG. 28 an enlarged view of the area where shaft 54' connects to indexing disk 44' is shown. As can be seen therein, cap 60' holds indexing disk 44' onto the upper end of shaft 54'. Collar 62' is slidably mounted on shaft 54' and is in turn connected via pins 64' to retracting head 46'. A spacer 67' is slidably mounted within indexing disk 44' and encompasses each pin 64'. While eight such pins are provided, only two are shown in FIG. 28.

Collar 62' is slidably and rotatably mounted in casting 66'. Casting 66' is in turn fastened to rigid member 68' which forms a portion of the frame of the machine. Casting 66' is provided with a circumferential groove 70' wherein there is seated a resilient vacuum valve member 72'. Resilient member 72' is biased upwardly against valve plate 76' by a plurality of springs 74'. The construction of the vacuum valve is shown in greater detail in FIG. 29. Resilient member 72' is provided with a groove 78' which is connected to a source of vacuum by port 79'. Valve plate 76' is provided with a plurality of holes 80' which align with groove 78'. A hole 81' also aligns with groove 78' but, as will hereinafter be seen, is switchable from vacuum to pressure. As indexing disk 44' (FIG. 27) rotates, valve plate 76' also rotates and causes the identity of hole 81' to shift to a succeeding hole in the plate. The application of a vacuum to groove 78' provides a vacuum via holes 80' and 81' in valve cover 76' to the eight respective vacuum pencils 42'. The vacuum paths can be traced in FIG. 28 from vacuum port 79', to groove 78', hole 80' in vacuum plate cover 76', through orifice 82' in indexing disk 44', through the orifice in rigid tube 84', and via resilient tube 86' to vacuum pencils 42'. Each of rigid tubes 84' is fixed in indexing disk 44' and passes through a clearance hole in retracting head 46'. Washers 88' and springs 90' provide a positive return force for retracting head 46' during the operation of the machine.

Returning now to FIG. 29 the vacuum valve is provided with a pressure input via tube 92' and port 94' in resilient member 72'. When valve cover 76' is in its normal position over resilient member 72' holes 80' and 81' align with groove 78' and pressure port 94' does not align with any hole. However, pusher member 96', which is fixedly attached to resilient member 72' may be impelled to the right to cause resilient member 72' to rotate and thereby align pressure port 94' with hole 81'. Instead therefore of a vacuum being applied to hole 81' from grove 78', a positive pressure is there applied. This feature is utilized at the sorting station 38' whereby a chip held on the tip of a vacuum pencil 42' is positively pushed off by the applied pressure and into the vacuum sorting mechanism.

Returning to FIG. 27 it should be remembered that the means for providing the index drive to indexing head 40' is via shaft 54' from indexing mechanism 56'. The indexing drive is transmitted to indexing disk 44' by shaft 54'. The indexing motion is in turn transmitted to retracting head 46' via pins 64' and spacers 67'. The means provided for raising and lowering retracting head 46' and for selectively switching the vacuum and pressure inputs are multiple cam 110' and follower arms 120' and 130'. Multiple cam 110' is mounted on shaft 111' and makes one rotation per index of indexing head 40'. An internal connection within indexing mechanism 56' transmits the rotary motion of shaft 58' to shaft 111'. A plurality of cam operated circuit breakers (not shown) are also mounted on shaft 111' and will be discussed hereinafter in relation to the operation of chip orientor 28'.

Multiple cam 110' is composed of two cams, inner cam 112' and outer cam 114', the operations of these cams being essentially complementary. Follower 122' of follower arm 120' rides on the surface of inner cam 112' and follower 132' of follower arm 130' rides on the surface of outer cam 114'. Follower arm 120' is hinged at point 124' and is provided at one extremity with an extended pin 126' which rides in slot 128' of collar 62'. Remembering that collar 62' is slidably mounted on shaft 54', it will be seen that when follower 122' is pushed in a counterclockwise direction by the camming surface of inner cam 112', follower arm 120' will also so rotate and interact with slot 128' to push collar 62' in an upward direction. This upward movement will be transmitted via pins 64' and spacers 67' through indexing disk 44' to retracting head 46'. Retracting head 46' will therefore be raised and will, in turn, raise vacuum pencils 42' to a point where their tips and the chips which they carry, clear any obstacles in the indexing path. The exact opposite will occur when follower portion 122' returns to the low dwell of inner cam 112'.

Follower arm 130' is hinged at point 133' and has an extended arm portion 134'. Pusher arm 96' of the vacuum valve extends through slot 135' in casting 66' and is biased to the left by a spring which is attached to post 136'. When follower 132' rides upon the high dwell of outer cam 114', follower arm portion 134' bears against pusher 96' and rotates resilient vacuum valve member 72' in a counterclockwise direction. This allows the aforementioned alignment of hole 81' with pressure port 94'. Subsequently in the index cycle, follower 132' falls to the low dwell on outer cam 114' and allows the spring to return resilient member 72' back to its original state whereby vacuum is applied to all pencils.

VIBRATORY BOWL FEEDER

The first function which must be performed by the semiconductor chip handler is that of providing the semiconductor chips to a vacuum pencil pick-off point in a contact-down, squared-off configuration. More particularly, a continuous feed of semi-conductor chips must be provided which are oriented in a known manner so that a vacuum pencil will always hold a chip with its contacts exposed in one of a number of predetermined configurations. Vibratory bowl feeder 25' (FIG. 26) provides this function. A large number of chips are placed in the center of the bowl which then proceeds to feed them to a pick-off station. Since the chips are square on a side, the bowl has the capability of providing a chip at a pick-off station in any one of four squared-off orientations. In all cases, a chip is invariably provided to the pick-off station with a contact-down configuration.

Figure 30:
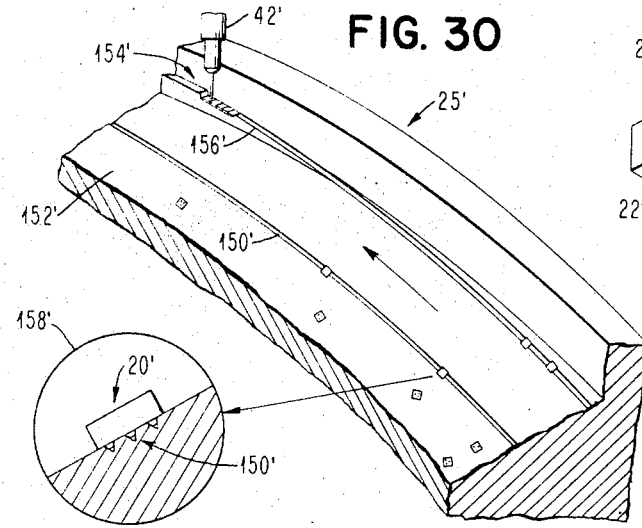
FIG. 30 is a partial isometric section of a vibratory feed bowl adapted to function with the system.

Turning now to the sectional view of FIG. 30 vibratory feed bowl 25' is provided with a spiral track 150' which runs along inclined surface 152'. A vibratory driver (not shown) provides bowl 25' with a combined rotary and slight vertical vibration. Such vibrators are well known in the art and will not be hereinafter discussed. Track 150' leads to pick-off station 154' via an inclined plane 156'. As shown in the enlarged view 158', track 150' comprises a plurality of grooves which are adapted to catch and hold the protruding contacts on the bottom of semiconductor chip 20'. Once a chip is so held in a track, the vibratory motion applied to bowl 25' causes the chip to move along track 150' until it finally reaches pick-off station 154'. If, on the other hand, a chip is caused to precess along the inclined plane 152' in a contacts-up configuration, the vibratory motion and the incline will combine to cause the chip to slip back down to the central portion of bowl 25'. It should be here realized that vibratory feed bowl 25' is shown only schematically and that various camming surfaces and other features are usually included to eliminate misaligned semiconductor chips from track 150'.

CHIP ORIENTATION SENSOR

Figure 31:
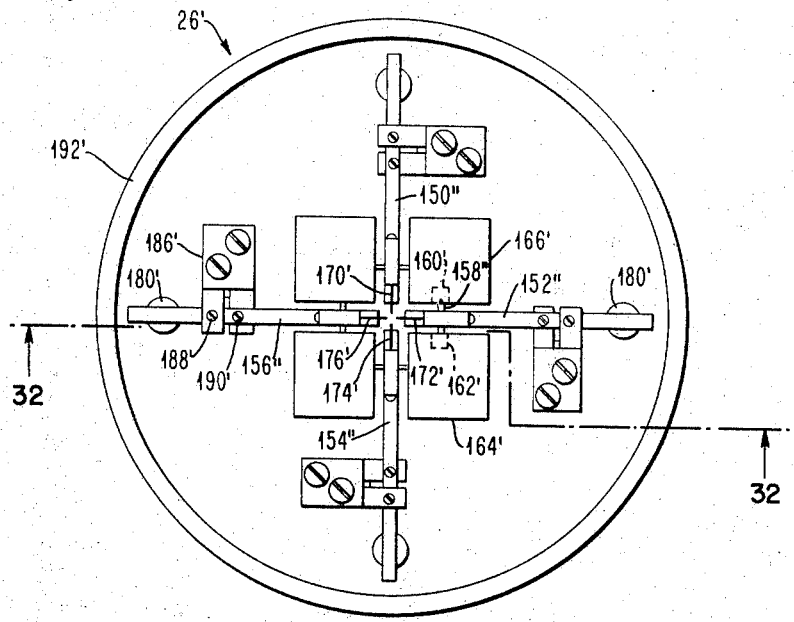
FIG. 31 is a plan view of the semiconductor device orientation sense station with the cover plate removed.
Figure 32:
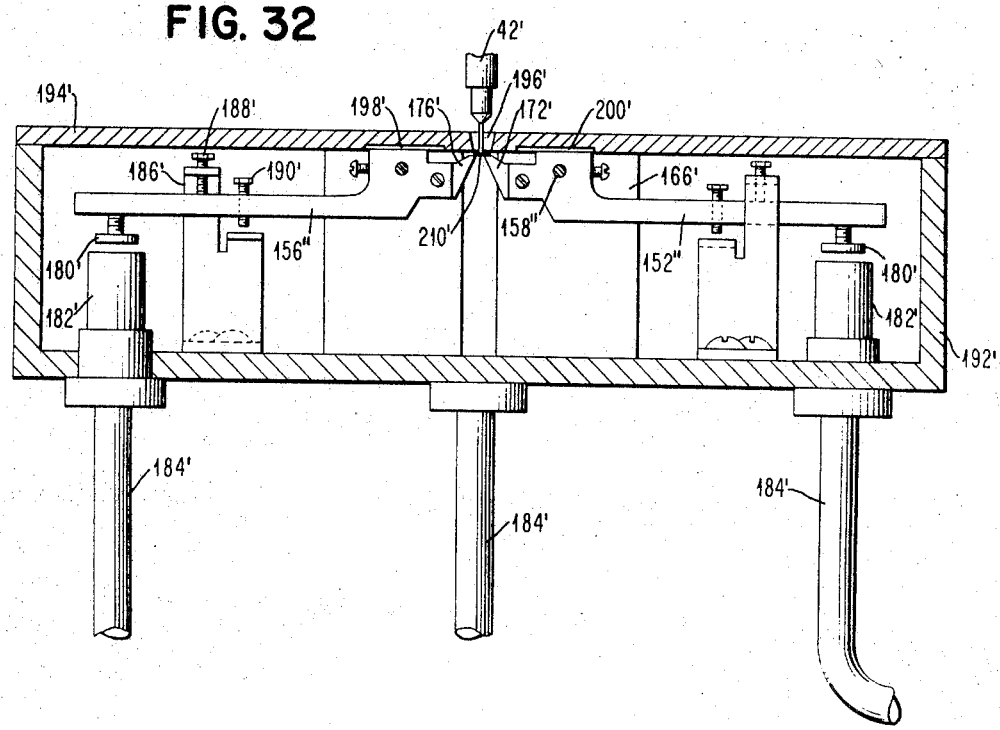
FIG. 32 is a section of the semiconductor device orientation sense station along the line 32—32 with the cover plate in place.
Figure 33:
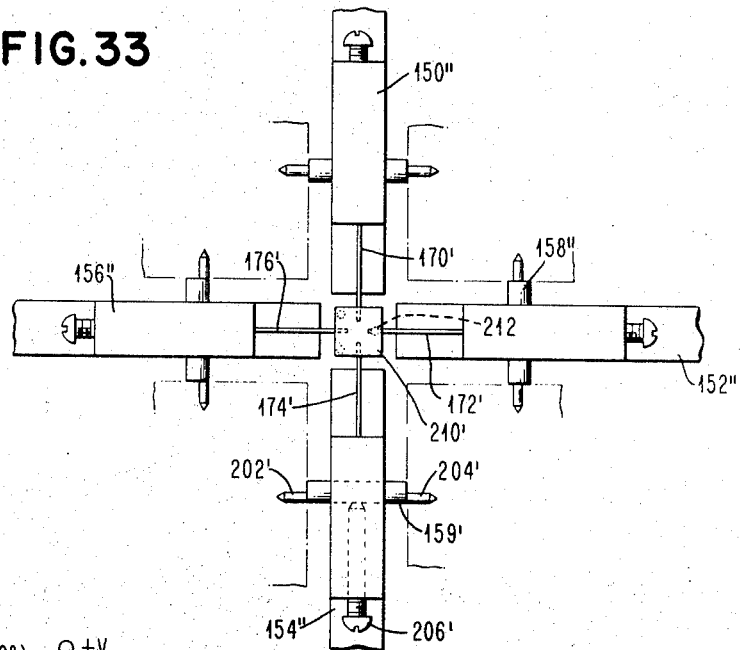
FIG. 33 is an enlarged view of the contract sense arms with a semiconductor device in place.

A semiconductor chip, once it is picked up by vacuum pencil 42', may have its contact oriented in any of four directions. Before the semiconductor chip is tested, its contacts must be repositioned so that they are properly oriented with respect to the electrical contacts included in a test station. The function of precisely determining the orientation of a chip's contacts is performed by chip orientation sense station 26'. A plan view of chip orientation sense station 26' with its cover removed is shown in FIG. 31 and a section thereof along line 32—32 is shown in FIG. 32 (with the cover in place). An enlarged view of the chip sensing area is shown in FIG. 33.

The main elements of orientation sense station 26' are identical lever arms 150'', 152'', 154'' and 156''. An exemplary, lever arm 152'' is pivoted on a pivot arm 158'' which is journaled in bearings 160' and 162', which are, in turn, embedded in mounting blocks 166' and 164', respectively. Each of the pivot arms of lever arms 150'', 154'' and 156'' are likewise mounted in bearings which are embedded in respective mounting blocks.

Feeler blades 170', 172', 174' and 176' are rigidly mounted at one extremity of each of lever arms 150'', 152'', 154'' and 156'', respectively. Mounted at the other extremities of each of these lever arms are ferrite plugs 180'. Each ferrite plug is positioned directly over a housing 182' which contains the inductor portion of a tank circuit of an oscillator. Each inductor is connected to its respective oscillator (not shown) via a coaxial cable 184'.

A deflection limiter 186' with adjusting screw 188' threaded therein is provided for each lever arm. Screw 188' provides an upper limit for the travel of lever arm 152'' whereas screw 190', which is threaded in arm 152'', provides the lower travel limit. Housing 192' enclosed the entire mechanism. Cover 194' fits over housing 192' and is provided with an orifice 196' into which a semiconductor chip may be placed by a vocuum pencil 42'. Cover 194' is also provided with shallow wells 198' and 200' which allow the lever arms to pivot in such a manner that the feeler blades are flush with the underside of the orifice 196' when no semiconductor chip is in place.

Referring now to the enlarged view of FIG. 33 lever arm 154'' is provided with a pivot arm 159'. A pair of eccentrically located pivot points 202' and 204' extend from either end of pivot arm 159'. The center section of pivot arm 159' is prevented from rotating with respect to lever arm 154'' by set screw 206'. Each of the other sense arms 150'', 152'' and 156'' contains a similar pivot arm. These pivot arms provide the capability for adjusting the relative positions of feeler blades 170'–176' with respect to orifice 196' and to each other. In other words, by rotating any one of the pivot arms, the respectively connected feeler blade can be made to move in or out from the center point of the mechanism. When it is realized that each of these feeler blades must detect the presence or absence of a protruding contact, that contact having a lateral dimension in the order of .005 inch, the significance of this adjustability feature is realized.

Returning now to FIG. 32, the nearness of a ferrite tip 180' with respect to its inductor housing 182' controls the frequency of oscillation of the associated oscillator tank circuit connected at the other end of coaxial cable 184' (not shown). Thus, as ferrite tip 180' is moved away from inductor housing 182', the inductance of the coil tends to decrease causing an increase in the frequency of oscillation. On the other hand, if ferrite tip 180' is brought closer to inductor housing 182', the inductance increases causing a decrease in the frequency of oscillation. When no semiconductor chip is in place, lever arms 150'', 152'', 154'' and 156'' are positioned at their lowest point of travel. This assures the closest proximity of ferrite tips 180' to inductor housings 182' with resultant lowest frequencies of oscillation. This proximity sensor is only one of any of a number which can be used. A suitable alternative is a "4905 Proximity Control Unit," which is a product of the Electroproducts Laboratory, Inc., Chicago, Ill. In the alternative a simple electrical make and break contact is suitable if the arm deflection is sufficient to assure reliable operation.

Assuming now that vacuum pencil 42' inserts semiconductor chip 210' through orifice 196', the operation of the mechanism will be described. If, as shown in FIG. 33 semiconductor chip 210' is positioned so that its distinctive contact 212' is oriented to the right, feeler blade 172' will be deflected downwardly by the extent of the thickness of protruding contact 212'. This will in turn cause lever arm 152'' to deflect upwardly with a resultant increase in the frequency of its associated oscillator. This increase in frequency is easily detected and provides an indication of the specific one of the lever arms which was deflected. Each of the other feeler blades is so positioned that it falls between the contacts on the underside of chip 210'. It can thus be seen that dependent upon the orientation of distinctive contact 212', one feeler blade will invariably be deflected. The signal resulting from this deflection is detected and utilized to control succeeding chip orientor station 28'.

CHIP ORIENTOR

Once the orientation of a semiconductor chip is known, the object is to reorient the chip so that its contacts are properly positioned for connection to the test station. If the chip is found to be oriented properly, no reorientation is required; however, if a chip is found in any one of the other three possible orientations, it must be rotated to the proper orientation.

Referring now to FIG. 34 chip orienting head 220' is rigidly mounted on shaft 222'. A portion of chip orienting head 220' has been cut away to show insert 224' which is machined to provide a chip receiving well 226' (see FIG. 35). Any chip inserted by vacuum pencil into well 226' will be securely held in place at the bottom of the well by the inclined sides of insert 224'.

Pulley 228' is rigidly attached to hub 230' and is driven by belt 232', which is in turn continuously driven by a suitable drive mechanism. A smaller diameter portion 234' of hub 230' extends into a spring clutch mechanism (to be hereinafter described). Pulley 228', hub 230' and smaller diameter portion 234' freely rotate on shaft 222' in response to the movement of belt 232'. Collar 236' is also mounted on shaft 222' and is rigidly secured thereto by set screw 238'. Spring 240' is wound around both collar 236' and hub portion 234'. A sleeve 242' encompasses spring 240' and is mounted so as to be rotatable in relation to collar 236' and hub portion 234'. Spring 240' has a bent-down section 244' which rigidly attaches it to collar 236' and a bent-up portion 246' which extends through a slot in sleeve 242' and thereby creates a rigid attachment thereto. A stop 248' is attached to the outer surface of sleeve 242' and provides means for disengaging the spring clutch mechanism. The sectional view of FIG. 36 shows stop 248' in greater detail as well as showing bent-up portion 246' of spring 240' extending into a slot in sleeve 242'. Also shown in FIG. 36 (not illustrated in FIG. 34) are relay latch mechanisms 250', 252' 254' and 256' which are selectively operable to interact with stop 248' to disengage spring 240' from hub portion 234'. Each of relay latches 250', 252', 254' and 256' is provided with a relay coil 250a', 252a', 254a' and 256a' as well as a detent 250b', 252b', 254b' and 256b'. Each of the aforementioned detents is normally spring biased away from its corresponding relay coil. In such configuration, a detent is positioned so as to interact with stop 248' to prevent further rotation of sleeve 242'. When a respective relay coil is energized, the associated detent is retracted and with withdrawn from the path of stop 248'.

In the succceeding discussion, it will become apparent that the orienting mechanism of FIGS. 34–37 has for its main object the reorientation of a received semiconductor chip so that the distinctively placed protruding contact is aligned with relay latch 250'. For this reason, the position of relay latch 250' is referred to as the home position and the positions of relay latch mechanisms 252', 254' and 256' are referred to as the 90°, 180° and 270° positions, respectively.

Returning now to FIG. 34 the lower end of shaft 222' is journaled in bearing mechanism 260'. A like bearing mechanism may also be included between hub 230' and orienting head 220'. Mounted immediately below bearing mechanism 260' is ratchet 262', which is more clearly shown in FIG. 37. Ratchet 262' is provided with four stops which continually engage pawl 264' as shaft 222' rotates in a counterclockwise manner. The purpose of ratchet 262' and pawl 264' is to prevent any reverse rotation of shaft 222' from occurring when one of the detents 250b'–256b' interacts with stop 248'.

The operation of the orienting mechanism of FIG. 34 can be understood by first assuming that all detents 250b', 252b', 254b' and 256b' are in their retracted position. In this case, the continual rotation of hub portion 234' causes spring 240' to wind tightly around collar 236'. This results in a transmission of the drive motion of hub portion 234' through spring 240' to collar 236' thereby imparting a rotary motion to shaft 222' and orienting head 220'. If, on the other hand, any one of detents 250b'–256b' is extended, it engages stop 248' thereby causing a slight counter rotation to spring 240' through bent-up portion 246'. This small counter rotation causes spring 240' to become sufficiently loose around hub portion 234' to prevent the transmission of drive motion therethrough. This action abruptly terminates the rotary movement of collar 236' and shaft 222'. Ratchet 262' and pawl 264' interact to prevent any counter rotation of shaft 222' when the above-mentioned action occurs.

CHIP ORIENTOR CONTROL CIRCUITRY

Figure 38:
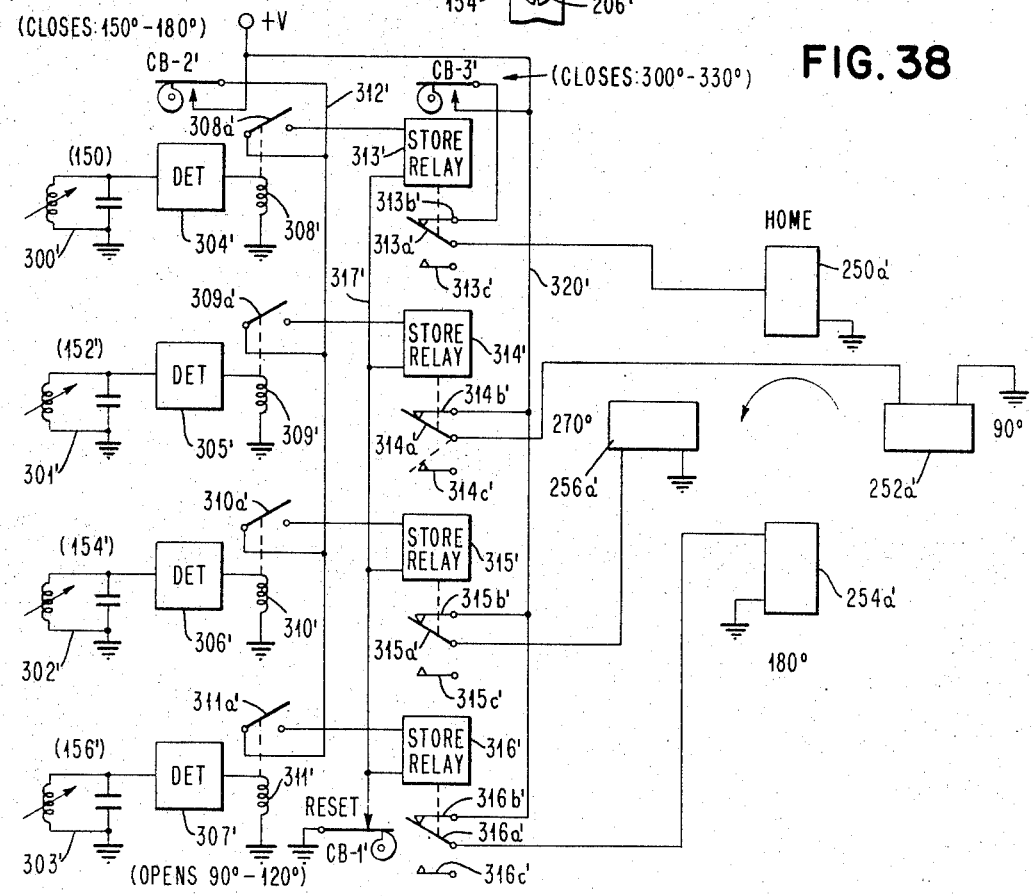
FIG. 38 is a diagram of the circuit which controls the semiconductor device orientor station.

In FIG. 38 is shown the interconnecting circuity between chip orientation sense station 26' and chip orientor station 28'. This circuit controls the amount of rotation which chip orienting head 220' imparts to a received semiconductor chip in response to a signal from orientation sense station 26'.

The inputs to the circuit area provided via tank circuits 300'–303'. The inductance portion of each of the aforementioned tank circuits is shown as variable to indicate the changes in inductance which occur as a result of the movement of ferrite plugs 180' with respect to inductor housings 182' (FIG. 32). Tank circuits 300'–303' are respectively associated with lever arms 150" 152", 154" and 156" in chip orientation sense station 26'. The output from each tank circuit 300'–303' is applied to an associated frequency detector 304'–307'. If any detector senses an increase in the oscillation frequency of its associated tank circuit (indicating the deflection of one of ferrite heads 180' in an upward direction) it will cause a current to pass through its associated output coil 308'–311'. The energization of any of coils 308'–311' results in the closure of an associated normally open relay switch 308a'–311a'. The circuitry contained within such frequency detectors is well known and will not be hereinafter discussed.

A source of positive potential +V is connected via cam operated circuit breaker CB–2 and conductor 312' to one side of relay switches 308a'–311a'. The other side of each of switches 308a'–311a' is respectively connected as an input to a storage relay 313'–316'. A ground connection is applied to each of storage relays 313'–316' via conductor 317' and cam operated circuit breaker switch CB–1'. Storage relays 313–316' are of the variety which are provided with a holding circuit that retains their enerigized conditions after an input signal has been removed. These relays may be reset by causing circuit breaker CB–1' to open ground return line 317'.

Each of storage relays 313'–316' is adapted to actuate an associated relay arm 313a'–316a'. When any of the storage relays is deenergized, its associated relay arm is spring biased to the up position so that it contacts upper contact points 313b'–316b'. When in the actuated state, a storage relay will cause its associated relay arm to contact an open circuited lower contact point 313c'–316c'. Each of upper contacts 314b'–316b' is connected via conductor 320' to +V, whereas upper contact 313b' is connected to +V through circuit breaker switch CB–3'. Relay arms 313a'–316a' are respectively connected to an associated relay coil 250a', 252a', 254a' and 256a'. These relay coils are also shown in FIG. 36.

Figure 39:
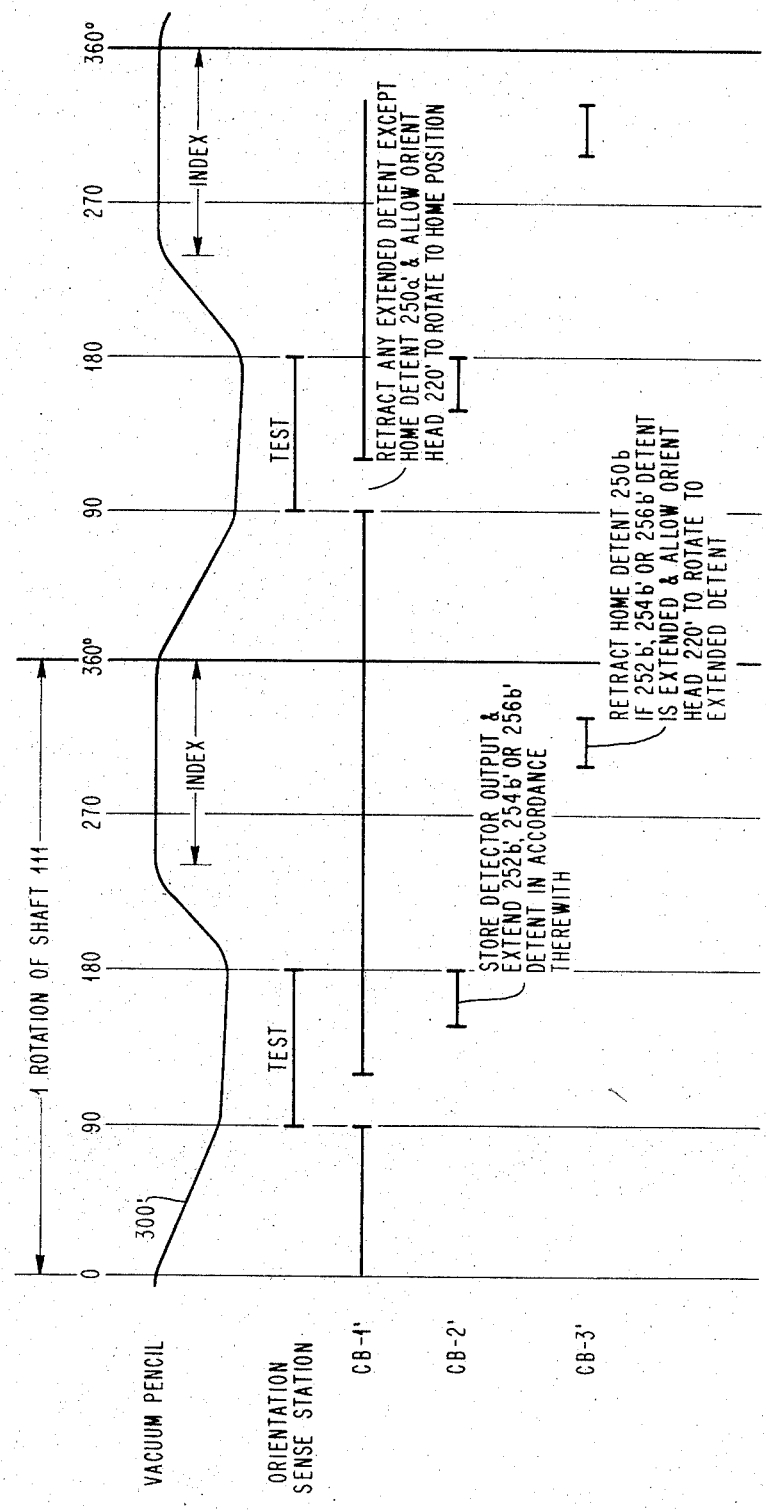
FIG. 39 is a chart describing the operation of the circuit of FIG. 38 and the semiconductor device orientor.

The timing chart of FIG. 39 will be helpful in explaining the operation of the circuit of FIG. 38. As stated during the description of FIG. 27 a plurality of circuit breakers (not shown) are mounted on and actuated by the rotation of shaft 111'. In addition, inner cam 112' responds to the rotation of shaft 111' by causing pencil retractor head 46' and in turn vacuum pencils 42', to be lifted and lowered at specific times during the indexing cycle. The action of each vacuum pencil as it responds to these movements is shown by curve 300' in FIG. 39. The horizontal axis of the chart is plotted in degrees of rotation of shaft 111'. As can be seen from curve 300', a vacuum pencil dwells at its lowermost position between 90°–180° and at its uppermost position during 240°–360°. During the other portions of an index cycle, the vacuum pencil is either being extended or retracted from a dwell position.

Since all pencils are actuated in unison, it can be seen that a vacuum pencil will invariably place a semiconductor chip into chip orientation sense station 26' at the 90° point of the cycle. In response thereto, one of the lever arms in the sense station will be deflected and will produce a signal output to one of frequency detectors 304'–307'. Ignoring for a moment the operation of circuit breaker switch CB–1' (which is closed at all times except during 90°–120°) home relay coil 250a' is deenergized due to the open state of CB–3' and each of the other relay coils 252a', 254a' and 256a' are energized. This results in detent 250b' being extended and all of the remaining detents being retracted. Stop 248' thereby rotates to the home position and is prevented from rotating any further by detent 250b'. Spring clutch 240" is disengaged and no further driving motion is imparted to shaft 222.

Assume now that lever arm 152" in orientation sense station 26' is deflected by the distinctive contact of an inserted semiconductor chip. As a result, detector 305' produces an output which energizes coil 309' and closes switch 309a'. Switches 308a', 310a' and 311a' remain open. At 150°, circuit breaker switch CB–2' is closed by shaft 111' and thereby applies a positive potential via conductor 312' to each of relay switches 308a'–311a'. Since only relay switch 309a' is closed, the positive potential is applied only to storage relay 314' thereby causing relay arm 314a' to connect to open circuited lower contact 314c'. The resulting loss of energization in relay coil 252a' allows detent 252b' to be extended. At this time detents 250b' and 252b' are extended and detents 254b' and 256b' are retracted (due to the energization of relay coils 254a' and 256a' circuits and allowing each relay arm to return to its rest position. Since the rest position for each of storage relays 314'–316' results in the respective relay arm connecting to its upper contact, each of which is continually powered by the application of a positive potential, the result is the energization of relay coils 252a', 254a' and 256a' and the retraction of any of the associated detents. In the particular case under consideration, only relay arm 314a' is moved (relay arms 315a' and 316a' already being at their rest positions) and detent 252b' thereby retracted. Note that this action also causes relay arm 313a' to contact upper contact 313b' but at this particular time in the cycle, contact 313b' is open circuited and detent 350b' remains extended.

All of the above action occurs immediately after the semiconductor chip just previously tested has been placed in well 226' by vacuum pencil 42'. The retraction of detent 252b' allows spring clutch 240' to be engaged and to rotate shaft 222' and orient head 220' to the home position. The rotation of orient head 220' is transmitted to the chip via engagement with the walls of well 226'. Since detent 250b' is extended, stop 248' is only allowed to rotate 90° before it is engaged and disengages spring clutch 240'. In this manner, the semiconductor chip is rotated the same 90° while still held on the end of vacuum pencil 42'. The chip is thereby oriented and ready for transport to the next station. The operation of the remaining portions of the circuit of FIG. 38 are substantially identical to those above described and will not be hereinafter discussed, except to point out that if a chip is found to be properly oriented, only storage relay 313' is operated and no orienting movement is imparted when the chip is placed in orient head 220'.

CHIP CONTACTOR

Figure 40:
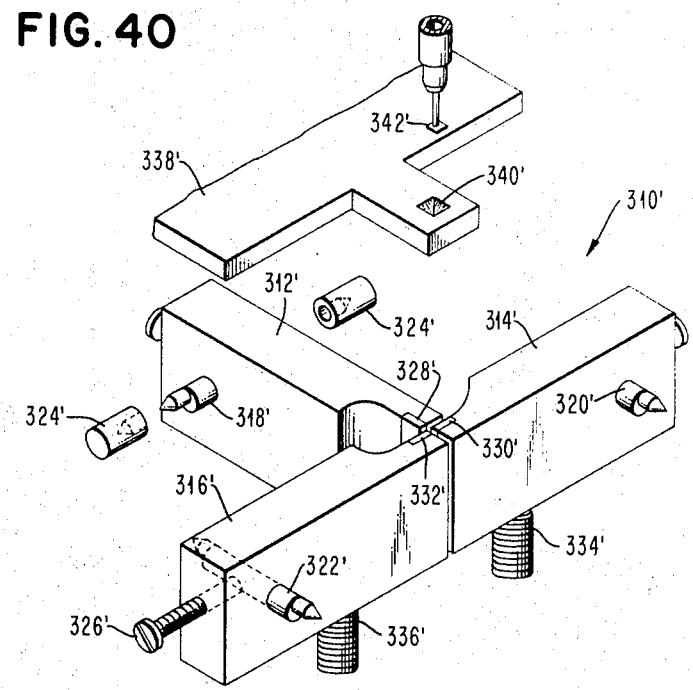
FIG. 40 is an exploded view of the semiconductor device contactor.

Once a semiconductor has been oriented, it is then subjected to a plurality of electrical tests to determine its characteristics and suitability for subsequent use. Each test station includes a chip contactor 310' (FIG. 40) which provides the means for connecting to the aligned protruding contacts on the under side of a chip.

The basic components of chip contactor 310' are contact arms 312', 314' and 316', each of which is pivoted on offset pivot arms 318', 320' and 322', respectively. The offset needle pivot points of each of pivot arms 218', 320' and 322' are journaled in bearings, e.g., 324', which are in turn supported within a rigid fixture (not shown). A set screw 326' bears against the interior portion of each pivot arm, e.g., 322', and prevents it from rotating with respect to its associated contact arm 316'. Each of pivot arms 318', 320' and 322' perform identical functions for their respective contact arms as pivot arm 158" performs for lever arm 152" in FIG. 33. A conductive insert 328', 330' and 332' is provided at one extremity of each of contact arms 312', 314' and 316'.

In this embodiment, contact arms 312', 314' and 316' are fabricated from a nonconductive plastic material which has good dimensional stability (e.g., polystyrene). Conductive inserts 328', 330' and 331' perform the function of providing electrical contact to the protruding contacts. While not shown, conductors are attached to each of conductive inserts 328', 330' and 332' and lead to the test circuitry with which chip contractor 310' is associated. Each of contact arms 312', 314' and 316' is biased upwardly via a spring, e.g., 334', 336', which acts to level the member and additionally provides a resilient support mechanism which yields when a chip is placed on conductive inserts 328', 330' and 332'. A preferably nonconductive cover 338' shields the contact mechanism and is provided with a chip receiving well 340'. When in the assembled form, well 340' provides a guide for an inserted chip, e.g., 342', so that its contacts are precisely brought into position over conductive inserts 328', 330' and 332'.

Figure 41:
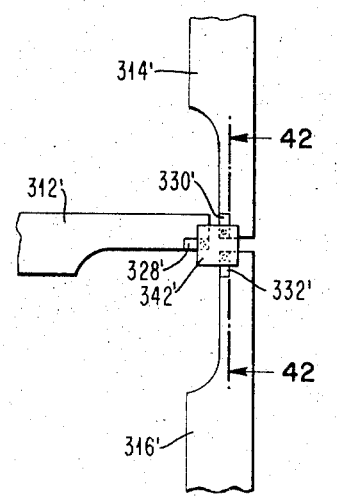
FIG. 41 is an enlarged plan view of the contacting heads of FIG. 38 with a semiconductor device in place.
Figure 42:
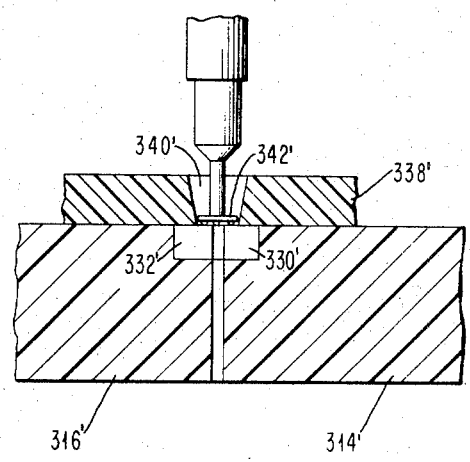
FIG. 42 is a partial section view along line 42—42 of the contactor of FIG. 41.

An expanded view of the contact area with a chip in position is shown in FIG. 41. Note, that each conductive insert connects only to a single contact on chip 342'. A further important point is that when chip 342' is placed in position over conductive inserts 328', 330' and 332', the fact that each of these inserts is separately mounted allows each one to make good electrical contact with a predetermined amount of force. FIG. 42 shows a side view of chip 342' in place over conductive inserts 330' and 332'. From FIGS. 41 and 42, it should be apparent that the adjustability feature provided by offset pivot arms 318', 320' and 322' is of extreme importance with respect to the contact mechanism due to the small areas which have to be contacted and their proximity.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for automatically testing electrical means and classifying each of the electrical means into one of a plurality of $n$ priority sort classifications comprising:
   (a) a plurality of test stations,
   (b) testing means associated with said plurality of test stations for performing a sequence of electrical tests on each electrical means fed to each of said test stations,
   (c) said testing means being operative to generate a plurality of output signal responses, each output signal response being associated with a particular test,
   (d) first means responsive to sequentially receive said plurality of output signal responses for producing a pass or fail signal indication for each of said received output signal responses,
   (e) second means comprising a plurality of $n$ circuit means, each of said plurality of $n$ circuit means being associated with respective ones of the $n$ priority sort classifications, and operative to generate *m* out of *n* output signals indicative of a priority sort classification, where *m* equals 1, 2 . . . *n*, (f) sort requirement means for selectively generating priority sort classification signal information for each test performed, (g) said second means being adapted to receive said priority sort classification signal information and said pass or fail signal indication, (h) said second means being simultaneously responsive to said priority sort classification signal information and a single one of said pass or fail signal indications for providing said *m* out of *n* output signals indicative of a priority sort classification, and (i) a third means responsive to receive said *m* out of *n* output signals indicative of a priority sort classification for dispensing the electrical means in accordance therewith.

2. An apparatus for automatically testing electrical means and classifying each of the electrical means into one of a plurality of *n* priority sort classifications as in claim 1 wherein:

(a) the electrical means comprises a device or component and each of said test stations includes said first and second means for selectively generating its own associated said *m* out of *n* output signals indicative of a priority sort classification, and (b) further including fourth means responsive to said *m* out of *n* output signals indicative of a priority sort from each of said test stations for producing ultimate *m* out of *n* output signals indicative of a priority sort classification, and (c) said third means being responsive to said ultimate *m* out of *n* output signals indicative of a priority sort classification for dispensing the electrical device or component in accordance therewith.

3. An apparatus for automatically testing electrical means and classifying each of the electrical means into one of a plurality of *n* priority sort classifications as in claim 2 wherein:

(a) said first means at each of said test stations includes an analogue comparator means for comparing each of said output signal responses received from said testing means with a predetermined reference level, (b) said plurality of *n* circuit means at each of said test stations comprises *n* logic circuits, (c) each of said *n* logic circuit means having a first input terminal means, each of said first input terminal means adapted to simultaneously receive a single pass or fail signal indication, and each of said analogue circuit means having a second input terminal, each of said second input terminals being adapted to selectively receive said priority sort classification signal information.

4. An apparatus for automatically testing electrical means and classifying each of the electrical means into one of a plurality of *n* priority sort classifications as in claim 2 wherein:

(a) said fourth means comprises a shift register means.

References Cited

UNITED STATES PATENTS

| | | | |
|---|---|---|---|
| 2,999,587 | 9/1961 | Campbell | 209—81 X |
| 3,032,191 | 5/1962 | Clukey | 209—75 |
| 3,142,382 | 7/1964 | Knowles | 209—75 |
| 3,236,374 | 2/1966 | Zimmerman | 209—75 |
| 3,259,240 | 7/1966 | Schneider | 209—75 X |

M. HENSON, WOOD, Jr., Primary Examiner

RICHARD A. SCHACHER, Assistant Examiner

U.S. Cl. X.R.

209—81

UNITED STATES PATENT OFFICE

CERTIFICATE OF CORRECTION

Patent No. 3,472,376                      October 14, 1969

John W. Broderick et al.

It is certified that error appears in the above identified patent and that said Letters Patent are hereby corrected as shown below:

In the heading to the printed specification, lines 4 to 8, "John W. Broderick, Rte. 9G, Hyde Park, N.Y. 12538; Robert M. Fiorenza, 5 Wilbur Blvd. 12603, and Michael Kozar, 34 Monroe Drive 12601, both of Poughkeepsie, N.Y.; and Harry L. Lineman, 20 Donney Drive, Wappingers Falls, N.Y. 12590" should read -- John W. Broderick, Hyde Park, N. Y., Robert M. Fiorenza, and Michael Kozar, both of Poughkeepsie, N.Y., and Harry L. Lineman, Wappingers Falls, N.Y., assignors to International Business Machines Corporation, Armonk, N.Y., a corporation of New York --.

Signed and sealed this 20th day of October 1970.

(SEAL)

Attest:

Edward M. Fletcher, Jr.                        WILLIAM E. SCHUYLER, JR.

Attesting Officer                                Commissioner of Patents